US006884866B2

(12) United States Patent
Bronshtein et al.

(10) Patent No.: US 6,884,866 B2
(45) Date of Patent: Apr. 26, 2005

(54) BULK DRYING AND THE EFFECTS OF INDUCING BUBBLE NUCLEATION

(75) Inventors: Victor Bronshtein, San Diego, CA (US); Kevin R. Bracken, Poway, CA (US); John G. Cambell, Encinitas, CA (US)

(73) Assignee: Avant Immunotherapeutics, Inc., Needham, MA (US)

( * ) Notice: Subject to any disclaimer, the term of this patent is extended or adjusted under 35 U.S.C. 154(b) by 116 days.

(21) Appl. No.: 10/274,719

(22) Filed: Oct. 18, 2002

(65) Prior Publication Data

US 2003/0155669 A1 Aug. 21, 2003

Related U.S. Application Data

(60) Provisional application No. 60/345,322, filed on Oct. 19, 2001.

(51) Int. Cl.[7] .................................................. C08F 6/00

(52) U.S. Cl. ....................... 528/486; 528/491; 528/492; 528/497; 528/501; 528/503; 521/50.5

(58) Field of Search ................................ 528/486, 491, 528/492, 497, 501, 503; 521/50.5

(56) References Cited

U.S. PATENT DOCUMENTS

| | | | |
|---|---|---|---|
| 2,427,786 | A | 9/1947 | Hoyler |
| 3,564,726 | A | 2/1971 | Nociti et al. |
| 4,035,924 | A | 7/1977 | Faure |
| 4,882,851 | A | 11/1989 | Wennerstrum et al. |
| 5,003,143 | A | 3/1991 | Marks et al. |
| 5,766,520 | A | 6/1998 | Bronshtein |
| 5,939,071 | A | 8/1999 | Joseph |

FOREIGN PATENT DOCUMENTS

| | | |
|---|---|---|
| GB | 593806 | 10/1947 |
| GB | 608611 | 9/1948 |
| GB | 625703 | 7/1949 |
| GB | 1 343 640 | 1/1974 |
| WO | WO 00/40910 | 7/2000 |

*Primary Examiner*—Samuel A. Acquah
(74) *Attorney, Agent, or Firm*—Yankwich & Associates, P.C.; Leon R. Yankwich; Michael R. Wesolowski

(57) ABSTRACT

The present invention discloses apparatus and methods of inducing bubble nucleation to overcome problems commonly associated with preservation by foam formation. Specifically, the invention relates to methods of using bubble nucleation in foam formation to preserve sensitive biological materials. Preferred methods of inducing bubble nucleation include, mixing, chamber rotation, crystals, and ultrasound.

15 Claims, 2 Drawing Sheets

BULK DRYING AND THE EFFECTS OF INDUCING BUBBLE NUCLEATION

RELATED APPLICATIONS

This application claims priority to provisional application No. 60/345,322 filed on Oct. 19, 2001.

BACKGROUND OF THE INVENTION

1. Field of the Invention

This invention relates to industrial scale preservation of sensitive biological materials. More particularly, the invention relates to technological processes and equipment for effecting the industrial scale dehydration of solutions and suspensions by foam formation, additionally providing a method for inducing bubble nucleation by mixing, chamber rotation, crystals, and ultrasound.

2. Description of the Related Art

The preservation and storage of solutions or suspensions of biologically active materials, viruses, cells and small multicellular specimens is important for food and microbiological industries, agriculture, medical and research purposes. Storage of these dehydrated biologically active materials carries enormous benefits, such as reduced weight and reduced storage space, and increased stability.

Suggestions in the prior art for providing preservation of sensitive biological materials in dehydrated form include freeze-drying and vacuum or air-desiccation. Both, freeze-drying and desiccation preservation methods have positive and negative characteristics. While freeze-drying methods are scaleable to industrial quantities, conventional vacuum and air-desiccation methods do not yield preparations of biological materials which are scalable to industrial quantities. Freezing and other steps of the freeze-drying process are very damaging to many sensitive biological materials. The freeze-drying process is very long, cost ineffective, and cannot be performed using barrier technology to insure sterility of the material.

Some of the problems associated with preservation by freezing and drying have been addressed by addition of protectant molecules, especially carbohydrates, which have been found to stabilize biological materials against the stresses of freezing and drying. However, despite the presence of protectants, the long-term stability after freeze-drying may still require low temperature storage, in order to inhibit diffusion-dependent destructive chemical reactions. Thus, further innovations have been sought to provide long-term storage of labile biological materials at ambient temperatures.

Storage of dried materials at ambient temperatures would be cost effective when compared to low temperature storage options. Furthermore, ambient temperature storage of biological materials such as vaccines and hormones would be extremely valuable in bringing modem medical treatments to third world countries where refrigeration is often unavailable. As the many benefits of shelf preservation of biological specimens have come to be appreciated, researchers have endeavored to harness vitrification as a means of protecting biological materials against degradative processes during long-term storage.

Unfortunately, the advantages of vitrification technology as a means of conferring long-term stability to labile biological materials at ambient temperatures has not been fully utilized. Conventional methods of ambient temperature preservation by desiccation are designed for laboratory processing of very small quantities of materials. Recently, Bronshtein developed an alternative method of preservation by foam formation (U.S. Pat. No. 5,766,520) that is compatible with large-scale commercial operations. Preservation by foam formation overcomes the technical problems related to scaling up desiccation and vitrification preservation processes. For this reason, preservation by foam formation is attractive as a scalable method for long-term storage of biological materials.

While foam formation is useful as a method for long-term storage of biological materials, several logistical problems remain to be solved. For example, during foam formation a large temperature gradient, up to 20 C., often persists throughout the drying chamber.

Large temperature gradients can lead to a number of technical problems including damage of sensitive biological material and increased processing time. Sensitive biological material can be damaged or destroyed in sections of the chamber where temperature is too high. Additionally, processing time is increased due to inconsistent temperature throughout the drying chamber. Furthermore, violent boiling can occur during foam formation resulting in material being carried up the chamber and thus, coating the chamber walls. Biological material splattered on chamber walls is prone to damage and, therefore lessens recovery of the sensitive material. For these reasons, an alternative method of drying sensitive biological materials by foam formation that prevents violent boiling and provides a uniformly dry, viable product would be beneficial.

The present invention addresses instrumentation problems related to preservation by foam formation and processing operations. Specially designed devices and instruments must be employed to reproducibly produce a dehydrated, shelf-stable, foams and uniform powder of the preserved materials.

SUMMARY OF THE INVENTION

The present invention discloses an apparatus and methods of inducing bubble nucleation to overcome problems commonly associated with preservation by foam formation. Specifically, the invention relates to methods of using bubble nucleation in foam formation to preserve sensitive biological materials.

In one embodiment, the invention relates to a process of preserving a biologically active material comprising loading a solution containing biologically active material into the foam formation apparatus and subjecting the solution to conditions which cause bubble nucleation. There are a number of ways in which bubble nucleation can be produced including mixing, chamber rotation, crystals, and ultrasound.

In one embodiment of the present invention, mixing can be used to induce bubble nucleation. Mixing, or simple agitation, can be produced with a stir bar. In a preferred embodiment of the invention, the stir bar is a flexible magnetic mixer ring, coated with Teflon, comprising short blades that can be folded. Mixing is useful because it can quickly disperse large temperature gradients, as measured in stationary mode experiments, decrease temperatures to be used in the heat transfer liquid, and reduce processing time.

In another embodiment of the present invention, chamber rotation can be used to induce bubble nucleation. Bubble nucleation, in this embodiment, is generated by the use of a vessel wall as a moving surface to impart shear forces. Shearing causes bubble nucleation and subsequent efficient drying and preservation of sensitive biological materials.

The invention also provides for the use of crystals as a means of bubble nucleation. Saturated solutions containing small crystals increase surface area and serve as bubble nucleation centers. Many different crystals may be used in the present invention. Some crystals that can be used are sucrose, fructose, glucose, trehalose, inositol, caffein, or amino acids.

In another embodiment of the present invention, ultrasound may be used to induce bubble nucleation. Especially preferred are ultrasonic waves in the frequency of 20 kHz to 500 kHz. Under foam formation conditions, irradiation of a liquid with ultrasonic waves leads to the formation and collapse of bubbles in a solution. Inducing bubble nucleation in this manner leads to boiling followed by foam formation of the biological material.

The invention also provides in a further embodiment of the invention, temperature sensors are used to monitor drying conditions. The temperature sensor may be located above the solution level, at the solution level, or below the solution level.

In another embodiment of the present invention, the invention relates to a process for preserving a biologically active material comprising, positioning a stir bar at the bottom of a foam formation process vessel, activating the stir bar to rotate and subjecting the process vessel to conditions sufficient to cause the solution to boil without freezing.

DETAILED DESCRIPTION OF THE PREFERRED EMBODIMENT

The present invention discloses a combination of preservation and processing apparatus and methods for application to biologically active materials. Disclosed herein are apparatus and methods of inducing bubble nucleation to overcome problems commonly associated with preservation by foam formation. Features and limitations of the methods and apparatus are described separately herein for the purpose of clarity.

Preservation by foam formation is particularly well suited for efficient drying of large sample volumes, before vitrification, and as an aid in preparing a readily milled dried product suitable for commercial use. Further details of preservation by foam formation are included in U.S. Pat. No. 5, 766,520 to Bronshtein; incorporated herein in its entirety by reference thereto.

The present invention relates to a vertical tube bulk drying apparatus for use in the preservation of sensitive biological materials by the process of foam formation. The apparatus consists of a heating system separated into bottom and sidewall (vertical) components. The bottom component is used in boiling biological materials at a low temperature under pressure and forming a foam from the material. The sidewall component is used for secondary drying of the foam.

The present invention also provides for a thermocouple arrangement consisting of at least two probes located at the bottom, at the surface, and/or just below the surface of the solution for monitoring the temperature profile of the solution via the temperature gradient. Further discussion of the features of the mechanical apparatus is provided in later sections infra The present invention also relates to methods for producing bubble nucleation. Bubble nucleation can be produced by a variety of means including mixing, chamber rotation, crystals, and ultrasound.

Mixing

In a preferred embodiment of the present invention, mixing, or simple agitation, can be accomplished by use of a stir bar. There are a number of stir bars commercially available which are compatible for use in the present invention. Alternatively, a host of modifications can be made to known stir bars for use in the invention. Some of the stir bars that can be used in the present invention include magnetic stir bars that are driven with a magnetic motor. In another embodiment of the invention, a flexible magnetic mixer ring, coated with Teflon, with short blades attached that can be folded up for insertion into the bulk dryer bag can be used. The flexible mixing impeller can be removed from the bag, cleaned and reused.

Mixing with a stir bar is useful in producing bubble nucleation. Low speed rotation from the stir bar causes a myriad of bubbles to form which are quickly dispersed throughout the solution. Violent bump-style-boiling associated with previous methods of foam formation ceases.

Figure 1:
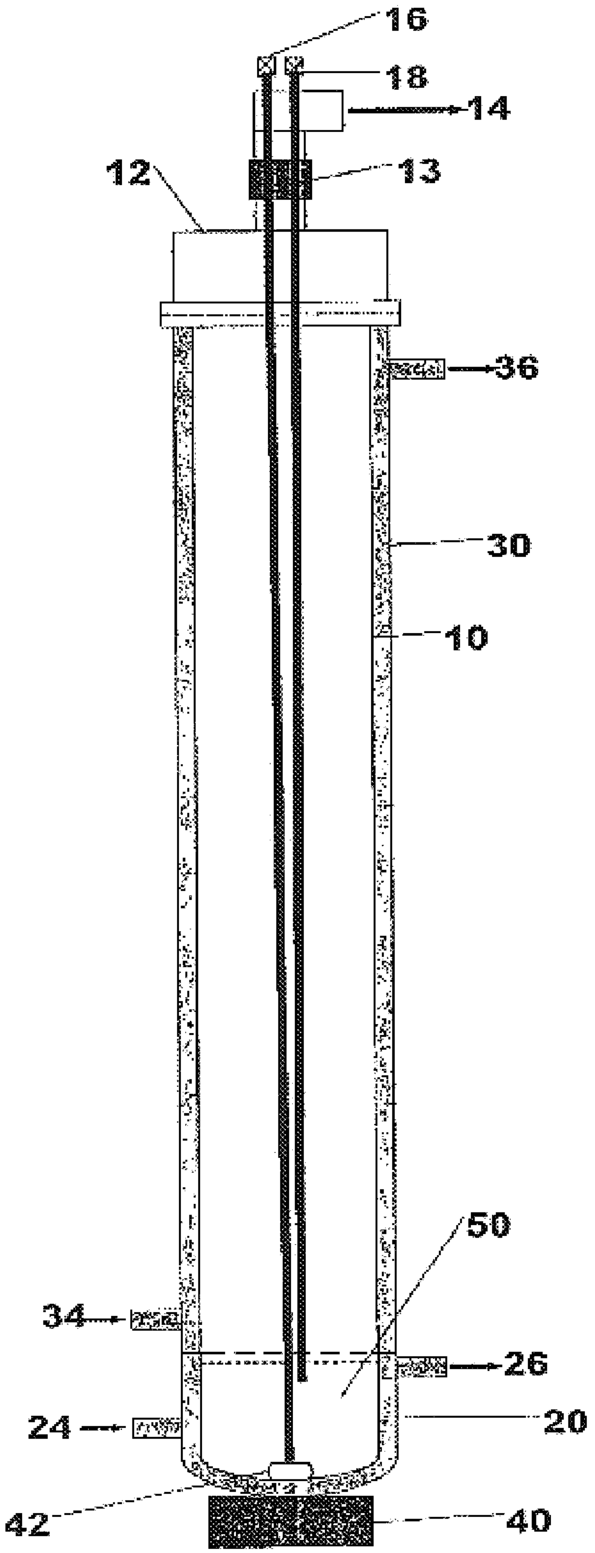
FIG. 1 is an illustration of the drying chamber apparatus, including a magnetic stir bar used for mixing and producing cavitation.
Figure 2:
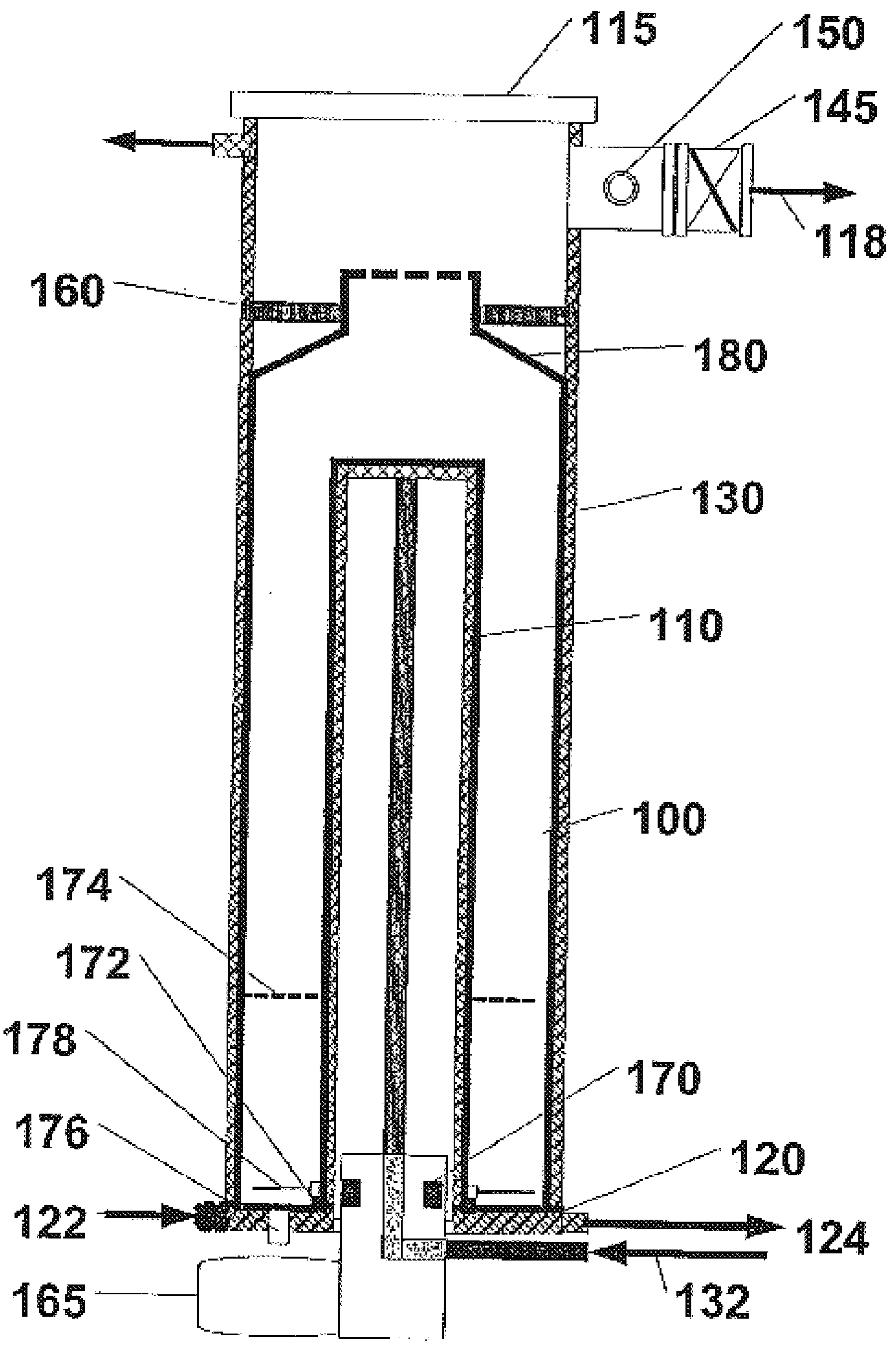
FIG. 2 is an illustration of a drying chamber apparatus configuration in which a flexible container or bag is used in the drying process.

Two preferred embodiments of the invention are described below and are illustrated by FIGS. 1 and 2.

In FIG. 1, preservation fluid as described in U.S. Pat. No. 5,766,520 (Bronshtein) is introduced to the drying chamber (10) via a removable top (12). Thermocouples (16), lower, and (18), upper, are introduced into the chamber to measure the fluid temperature during the preservation by foam formation process. The thermocouples are directed though a flexible connector (13), which in turn is attached to a vapor discharge port (14) that is piped to a refrigerated condenser and vacuum pump (not shown). A magnetic stir bar (42) is introduced to the bottom of the chamber (10). The drying chamber is sealed and heat transfer fluid is introduced to a bottom jacket (20) via a feed port (24), exiting via a discharge port (26) and circulating in continuous fashion to a heating/cooling source (not shown). Mixing is started by activating a magnetic mixer drive (40) located underneath the bottom of the chamber (10). The condenser is energized and a vacuum is introduced to the chamber (10). Preservation by foam formation is conducted according to the method of Bronshtein. As the system pressure drops below 15–20 torr (1995–2660 Pa), the rotating stir bar causes local fluid pressure to drop, further resulting in cavitation at the tips of the stir bar. This creates numerous bubbles, which grow in size due to the decreasing head pressure as they rise to the surface of the preservation fluid. The rapidly evolving water vapor is removed via the vapor discharge port (14) to the refrigerated condenser. The stir bar continues rotation until foaming commences. At that point bubbles are forming continuously. After the foam has become mechanically stable and has been dried for a time and temperature determined by the sensitivity of the material being preserved, secondary or, stability, drying can commence. Heat transfer fluid is introduced to the side jacket (30) via an inlet port (34) and discharged via an exit port (36), circulating continuously in a manner similar to the bottom jacket. The side jacket is necessary to reduce the heat transfer distance from the heat transfer surface to the center of the foam, thereby resulting in minimum drying time. After sufficient time, usually 30 hours or less of total processing time, vacuum is released and the material is removed from the chamber in a dry environment ($\leqq$15% relative humidity) to preclude water vapor absorption into the hygroscopic dry foam.

In FIG. 2, a flexible container or bag (180) is introduced into the drying chamber (100) via a removable top (115) and fixed in place with a removable holding device (160). The bag is constructed in such a way as to have a central cylindrical part that fits over an extended heat transfer surface (110) that is located in the center of the drying chamber (100). A flexible magnetic impeller (178) is introduced to the bottom of the bag (180) over the extended heat transfer surface (110). The impeller (178) rests on a hard plastic ring bearing (172) formed into the bag (180) that is designed to allow relatively friction free rotation and that prevents contact of the impeller (178) with the bottom of the bag (180). The plastic ring could be constructed of polyfluorotetraethylene, polypropylene, polyester, polycarbonate, or any other suitable plastic. Preservation fluid as described in U.S. Pat. No. 5,766,520 (Bronshtein) is introduced to the bag (180). An infrared or other non-immersion-type temperature sensor (176) is introduced into the chamber to measure the fluid temperature during the preservation by foam formation process. The drying chamber (100) is sealed and heat transfer fluid is introduced to a bottom jacket (120) via a feed port (122), exiting via a discharge port (124) and circulating in continuous fashion to a heating/cooling source (not shown). Mixing is started by rotating the impeller (178) via a magnetic mixer motor (165) and drive (170) located underneath the bottom of the chamber (100). The condenser is energized and a vacuum is introduced to the chamber (100). Preservation by foam formation is conducted according to the method of Bronshtein. System pressure is monitored via a pressure sensor or transducer (150). As the system pressure drops below 15–20 torr (1995–2660 Pa), the rotating impeller (178) causes local fluid pressure to drop further resulting in cavitation at the trailing edges of the impeller. This creates numerous bubbles, which grow in size due to decreasing head pressure as they rise to the surface of the preservation fluid. The rapidly evolving water vapor is removed through a vacuum valve (145) and the vapor discharge port (118) to the refrigerated condenser. The impeller (178) continues rotation until foaming commences. At that point bubbles are forming continuously. After the foam has become mechanically stable and has been dried for a time and temperature determined by the sensitivity of the material being preserved, secondary or stability drying can commence. Heat transfer fluid is introduced to the side jacket (130) and extended heat transfer surface (110) via an inlet port (132) and discharged via an exit port (134), circulating continuously in a manner similar to the bottom jacket. The side jacket (130) and extended heat transfer surface (110) arc necessary to reduce the heat transfer distance from the heat transfer surface to the center of the foam, thereby resulting in minimum drying time. The material is dried for sufficient time and temperature to achieve a target glass transition temperature upon post-processing cooling and storage. The entire process typically requires 30 hours or less of total processing time, at which point vacuum is released and the bag and its contents are removed from the chamber in a dry environment (≦15% relative humidity) to preclude water vapor absorption into the hygroscopic dry foam. Alternatively, the bag can be internally heat sealed or capped and the entire bag withdrawn in a normal ambient atmosphere. Later the bag can be gently crushed to permit the easy transfer of coarse granules to a storage container using a closed system or again a ≦15% RH dry room. The flexible magnetic mixing impeller can be removed from the bag, cleaned and reused.

Cavitation is produced at the blade ends of the stir bar. Cavitation is caused because in the foam formation system, pressure is low enough that rotation of the stir bar causes the local fluid pressure at the ends of the stir bar to fall below the vapor pressure of the solution at that temperature. Due to a decrease in fluid pressure below the vapor pressure of the solution, cavitation occurs and vapor bubbles form in the bulk solution. Changing the shape and style of the stir bar changes the frequency and size of bubbles formed.

A solution's tendency to cavitate is represented by the cavitation number, $\sigma_i$, as shown in the equation below.

$$\sigma_i = \frac{(P - P_v)}{\rho V^2 / 2}$$

Where P is the static pressure in stationary conditions, $P_v$ is the solution vapor pressure, ρ is the liquid density, V is the free-stream velocity of the liquid (which can be taken to be the tip speed of the stir bar). A low $\sigma_i$ implies increased tendency to cavitate. Of note is that as density goes up, cavitation is more easily produced and as system pressure falls cavitation is also more likely.

Introducing mixing can quickly disperse the large temperature gradients, as measured in stationary mode experiments. Instead, the solution evaporates until it has reached a critical viscosity level (or density level) wherein boiling commences, quickly followed by foaming. The nature of the biological materials being preserved requires restricted heat input because of potential effects on the sensitive material. Mixing allows for lower temperatures to be used in the heat transfer fluid (or other heat source) and faster processing time because of superior convective heat transfer. Cavitation provides a means of increasing the rate of bubble formation in the foaming process, and it reduces the size of bubbles being produced during the boiling process. This helps prevent the violent boiling and splashing of material onto the process chamber walls. Product entrainment in the exiting vapor stream is also minimized by the presence of cavitation. Uniform bubbling caused by mixing, minimizes much of the wall coating effect and the large temperature gradients in the bulk fluid which are seen in stationary drying.

Using this approach it is possible to lower the bottom jacket temperature to 5 C. for the primary foaming process and gradually increase it to 20 C. without the solution temperature exceeding 7 C. In addition, because of the improved heat transfer, the process time to reach the foaming point is reduced significantly compared to the time associated with considerably higher bottom jacket temperatures. This approach coupled with the improved heat transfer design has the possibility of reaching a 7–10 Kg capacity for the GMP bulk dryer even with highly sensitive materials.

The following working examples illustrate the benefit of using mixing with cavitation in accordance with the process of preservation by foam formation:

(1) The vertical glass tube bulk dryer was used to determine the effect of mixing with cavitation vs. no mixing on the time required to reach the point of foaming for the preservation by foam formation process. A mass of 400 g of sucrose/monosodium glutamate (MSG) at a ratio of 5:2 and 30% w/w in PBS was dried under stationary conditions. Initial liquid level was at 3.38 inches. The drying temperature was set at 20° C. initially and gradually raised to 40° C. Without mixing, this process required 5.5 hours to reach the point where foaming started, for a final foam height of 10.0 inches. Using a magnetic mixer and Teflon stir bar as the only system changes, the process was repeated, and the time required to reach the same foaming point was only 1.5 hours with an equivalent solution of 400 g of 5:2 sucrose/MSG. This is an improvement in processing time of over 250%.

Table 1 summarizes the results of this experiment. During the entire boiling process, cavitation at the stir bar tips created a myriad of bubbles, which dispersed throughout the solution. The mixing increased the vaporization rate because of improved heat transfer and the small size of the many bubbles reduced the splashing effect on the walls of the chamber from bubbles bursting at the surface.

TABLE 1

Comparison of Time to Foam and Total Process Time for a 400 g sample of 5:2 sucrose/MSG in PBS (mixing and cavitation were provided by a magnetic stir bar)

| | Time to Foam (hr) | Total Process Time (hr) |
|---|---|---|
| Without Mixing/Cavitation | 5.5 | 31 |
| With Mixing/Cavitation | 1.33 | 29.5 |

(2) The enzyme lactate dehydrogenase (LDH), a heat sensitive material, was used as a model in bulk preservation by foam formation using mixing with cavitation. The LDH was a lyophilized rabbit LDH sourced from Worthington Biochemical. It had an activity of 208 U/mg dry weight. One Unit (U) oxidizes one μmole of NADH per minute at 25° C., pH 7.3 using pyruvate as the substrate. A solution mass of 200 g was prepared consisting of 180 ml of 30% w/w 2:1 sucrose/raffinose in 100 mM Tris buffer and 20 ml of 1 mg/ml LDH also in 100 mM Tris buffer, pH 7.8. Final pre-drying LDH solution concentration was determined per a slightly modified assay method of Worthington vs. a standard curve run at dilutions of 2, 6 and 10 μg/ml in 3% sucrose/raffinose w/w. This showed actual bulk solution concentration at 110 μg/ml. Assays are conducted at a tenfold dilution.

Lyophilized LDH is a sensitive material that must be kept at a 2–8° C. storage temperature to maintain activity. The bulk preservation by foam formation process was conducted starting at a bottom water jacket temperature of 5° C. The temperature was raised stepwise over a 1.5 hour period to 20° C. and maintained at that temperature after the foam had fully formed. Solution temperature did not exceed 7° C. during the foaming process. After 14.5 hours from the time foam formed, the sidewall jacket was opened to flow and the jacket temperature was increased to 50° C. in ten degree increments over 90 minutes. This temperature was maintained for an additional 25 hours. After purging the chamber with nitrogen and removing the contents, a sample was analyzed for LDH activity. Results showed an activity of 88% of the starting material (9.6 μg/ml versus the original 11 μg/ml). This procedure demonstrated that preservation by foam formation using a cavitating mixer to improve heat transfer, reduce processing time and reduce splashing and carryover of liquid material can produce preserved material successfully.

Chamber Rotation

In another preferred embodiment, bubble nucleation may be generated by the use of a vessel wall as a moving surface to impart shear forces to the preservation solution.

Shearing is caused by forces that are parallel to, and lie in, planes or cross-sectional areas. Shear forces cause contiguous parts of a structure or liquid to slide relative to each other. Shear is caused by tangential force acting on the surface.

Shear stress applied to a differential fluid element can be obtained by differentiating the applied shear force with respect to the element area in contact with the chamber wall:

$$\tau_{xy} = \frac{dF_x}{dA_y}$$

where $\tau_{xy}$ is shear stress, $F_x$ is the constant applied force, and $A_y$ is the area of the fluid element in contact with the chamber wall (Robert W. Fox and Alan T. McDonald, *Introduction to Fluid Mechanics,* $4^{th}$ ed., (1992).

Bubble nucleation produced via chamber rotation can quickly disperse large temperature gradients, as measured in stationary mode experiments. Instead, the solution evaporates until it has reached a critical viscosity level (or density level) wherein boiling commences, quickly followed by foaming. The nature of the biological materials being preserved requires restricted heat input because of potential effects on the sensitive material. Chamber rotation allows for lower temperatures to be used in the heat transfer fluid (or other heat source) and faster processing time because of superior convective heat transfer. Chamber rotation induced bubble nucleation provides a means of increasing the rate of bubble formation in the foaming process, and it reduces the size of bubbles being produced during the boiling process. This helps prevent the violent boiling and splashing of material onto the process chamber walls.

The chamber rotation apparatus is constructed as follows:

A vacuum chamber was fabricated consisting of an 18-in. (45.7 cm) diameter by 42-in.(106.7 cm) long, cylindrical, stainless steel vessel with a Plexiglas access/viewing door at one end and the other end closed. The vessel was positioned near-horizontally at a 4-degree angle. Within the chamber a 15-in. (38.1 cm) diameter by 36-in. (91.4 cm) long aluminum cassette device was placed and affixed to a drive coupling that could rotate the cassette using an externally located motor. A cylindrical flexible plastic bag with a 4-in. (10.2 cm) diameter opening on the end facing the Plexiglas chamber door was placed within the interior volume of the cassette such that the bag contacted the entire cassette wall. The opening in the cassette and bag allowed for water vapor escape and operator viewing through the chamber door during the preservation by foam formation process. The chamber was connected to a custom fabricated 5 HP refrigerated condenser via a port at the closed end of the chamber. One infrared and two thermistor type temperature sensors were positioned at 3 spots along the length of the cassette. The infrared sensor was located farthest from the access door, about 3 inches (7.6 cm) from the low end of the cassette cylinder. In the at rest, or zero degree position, the bag lay on top of the temperature sensors, so the temperature sensors would indirectly measure the temperature of the contents of the bag. Watlow flexible electric heaters were attached to the exterior of the cassette to provide the heat energy necessary for the process. Temperature signals and heater power were handled by a signal conditioning board bolted to the exterior of the cassette and a slip ring connector such that rotation of the cassette would not interfere with either the temperature signals or power transmission. A Watlow F4 ramp/soak programmable controller was used to control the temperature setpoint for the heater blankets. The vacuum signal was sensed by a MKS model 628 transducer located on the top of the vacuum chamber near the door end. Vacuum setpoints were also programmed into the Watlow controller. Vacuum control was achieved by sending an on/off signal to a solenoid valve located between the system condenser and vacuum pump.

Using the previously described apparatus, two versions of this experiment were conducted.

(1) In Experiment No. 1 a 1.7 L solution of 50% *Lactobacillus acidophilus* (total CFU=1.42E+12) in PBS was mixed with 50% preservation solution (60% sucrose, 10% glutamic acid, 30% PBS) to make a bulk solution of 3.4 L. Total CFU after mixing showed no loss at 1.50E+12. The bulk solution was placed in the cassette bag and the material was preserved according to the method of Bronshtein (U.S. Pat. No. 5,766,520). The cassette was rotated at 2 rpm and the bulk solution was dried until the onset of significant foaming, at which point rotation was stopped and foaming continued uninterrupted until the entire bulk was foamed. At the start of the process the system pressure was lowered over two hours from 18 torr (2394 Pa) to 4.8 torr (640 Pa) and the bulk solution went through an evaporation phase with little visible bubbling. The heater start time was delayed approximately 2 hours. Because it was relatively fluid, the bulk solution stayed in the bottom of the cassette and was stirred by the moving cassette wall underneath it. During the next 3.5 hours, the system pressure was lowered from 4.8 torr (640 Pa) to 1.7 torr (226 Pa), while the jacket temperature was quickly increased to 45 C. As the solution lost water and grew more dense and viscous, it would start to follow the moving cylindrical wall of the cassette and bubbles would form at the liquid/bag interface. This behavior became considerably more pronounced as solution viscosity increased. The shearing effect of the rotating wall at the fluid/liquid interface induced bubble formation by reducing the local system pressure below the equilibrium vapor pressure. With a fluid depth of approximately 4 inches, fluid head pressure can add as much as 4 C. to the boiling point (Kern, *Process Heat Transfer*, p407–408). This local boiling point elevation can impede boiling. However, as the viscous bulk fluid is spread out on the moving wall of the cassette, the combination of reduced depth and local shearing action causes a local reduction in system pressure that allows for the nucleation of bubbles that would otherwise not occur. The bulk was foamed to completion and after 28.5 hr total drying time the process was stopped, the vacuum broken with nitrogen and the bag transferred to a humidity controlled dry room (RH 9% ) for sampling. Total CFU was 4.89E+11 for a survival yield of 34.4% .

(2) In Experiment No. 2 the same solution makeup was used as in Experiment 1. A 3.4 L solution of 50% *Lactobacillus acidophilus* (Total CFU=1.17E+12) in PBS was mixed with 50% preservation solution (60% sucrose, 10% glutamic acid, 30% PBS). Total CFU after mixing showed no loss at 1.21E+12. The bulk solution was placed in the cassette bag and the material was preserved according to the method of Bronshtein (U.S. Pat. No. 5,766,520). The cassette was held stationary (no rotation) for the entire bulk drying process. System pressure was lowered from atmospheric pressure to 4.8 torr (638 Pa) over 2 hours. During this time, the solution went through a 2-hour period of evaporation with only occasional visible bubble formation, even though the system pressure was below the equilibrium vapor pressure of the bulk solution temperature. Over the second two hours the system pressure was lowered from an initial setpoint of 4.8 torr (638 Pa) to 2.1 torr (280 Pa). Product temperature rapidly dropped in the first hour of the experiment to 0 C. at the deepest section of the bulk fluid, whereas the temperature sensors located in the shallower fluid depths never went below 10 C. The heater setpoint was 20 C. initially, but as soon as the product temperature dropped below 5 C. due to vapor evolution, the heater setpoint was raised first to 30 C. and then within 15 minutes to 45 C. Bubble formation became pronounced only after approximately 4 hours. Bubbles formed from the bottom of the solution at the bag/cassette wall and along the intersection of the liquid surface and the bag. The large surface area afforded by the horizontal chamber arrangement allowed this boiling to be easily seen through the viewing/access door. As the solution became progressively more viscous and dense from loss of water, the bubble formation and bursting became more violent in nature. This led to droplet splattering on the viewing/access door as the liquid droplets entrained in the quickly exiting vapor stream impacted the door before turning to head for the exit port at the rear of the chamber. Foaming commenced after approximately 6 hours. The bulk was foamed to completion and after 92.25 hr total drying time, the process was stopped, the vacuum broken with nitrogen, and the bag transferred to a humidity controlled dry room (RH 10% ) for sampling. Total CFU was 3.80E+11 for a survival yield of 32% .

Crystals

Many important biological materials and unstable biological materials cannot be dissolved in water. Rather these water insoluble materials can be dissolved in a water/alcohol mixture, water/DMSO mixture, or other mixtures of water in combination with another solvent. Therefore, drying from complex solvent mixtures is important to preserve many important water insoluble biological materials.

Bubble nucleation may be induced in saturated solutions via regular foam formation processes or, alternatively, through vortexing. Drying of sensitive biological material may be performed from saturated solutions containing small crystals. These small crystals increase surface area and serve as nucleation centers for bubble formation. Crystals that may be used in accordance with the present invention include sucrose, glucose, fructose, trehalose, inositol, caffein, amino acids.

The following working examples illustrate the benefit of using crystals to induce bubble nucleation in accordance with the process of preservation by foam formation:

(1) In order to initiate sucrose crystallization in 60 wt % sucrose, the solution was first frozen to −80 C. Immediately upon removal from the freezer, the frozen solution was then placed into a 60 C. sonicator water bath. The frozen solution was then sonicated for several minutes until the solution thawed and appeared cloudy with many tiny sucrose crystals. When the solution was allowed to sit at room temperature, the crystals grew rapidly. After several hours, the solution was thick with many crystals of sucrose.

We dissolved 10 mg biological material in 90 mg of (1:1 w/w EtOH:nanowater) 0.1 g dissolved drug to be filled per vial +0.9 g preservation solution. (10 mg biological material −100 mg dissolved biological material in (1:1 EtOH:nanowater)=10% biological material. Therefore, 0.1 g fill of dissolved biological material×10%=10 mg biological material filled per vial). We mixed 2.5 g biological material+22.5 g (1:1 EtOH:nanowater)=25 g total (2.5 g biological material÷25 g total=10% biological material), and then filled each 10 ml vial first with 0.1±0.005 g of dissolved biological material and then with 0.9±0.02 g of preservation solution. After filling the preservation solution in each vial, each vial was placed on a table, then each vial was hand swirled for approximately 10 seconds to evenly distribute the biological material in the preservation solution. Controls: 10 ml vials were filled with 0.9 g of preservation solutions listed above, plus 0.1 g of 1:1 mixture of EtOH with water. Vials were swirled to obtain final mix. The samples were placed on drying trays in the freeze-dryer modified to perform preservation by the foam formation process. The samples were dried so that the temperature in the sample was maintained above −10° C. and the maximum shelf temperature was held to 30° C.

All samples were boiled and transformed into mechanically stable dry foams in less than two hours from the beginning of drying (application of vacuum). Therefore, drying of biological materials may be performed from saturated solutions containing small crystals that serve as gas nucleation centers. The crystals further ensure boiling and subsequent foaming of the samples.

(2) 5 ml vials were filled with 0.5 ml of 13.33 wt % sucrose +6.66 wt % raffinose +2 wt % MAG preservation solution containing 2.5 μg of biological material. The initial shelf temperature was set to 5° C. Initial product temperature was 21° C. Then the vacuum was started. The vacuum level was brought to about 18 torr and held for 10 minutes. Product temperature began to decrease. After 10 minutes and subsequently, through the next 3 minutes, vacuum was decreased to 6 torr. Product temperature decreased to 5.7° C. The shelf temperature was set to 30° C. During the next 6 minutes the vacuum was slowly brought to 3 torr. The product temperature decreased to −2.4° C. The shelf temperature was had increased to 16.0° C. Vacuum level was decreased to 2.5 torr and held for 11 minutes. While the vacuum was at 2.5 torr, the product temperature decreased to −3.8° C. and then increased to −1.5° C. Boiling should have occurred by this point in the process, but no evidence of bubble nucleation was observed. During the next 12 minutes full vacuum was reached with no indication of boiling. The process was aborted. Vacuum was released. Vials were removed from the drier. Each vial was then vortexed. After all vials were vortexed, they were placed back into the drier. The vitrification process was restarted. Shelf temperature was decreased to 10° C. Product temperature was 18.2° C. The vacuum was restarted. Product temperature began to decrease. Vacuum level was brought to about 3.6 torr. Product began to boil as expected. Shelf temperature was raised to 25° C. Vacuum level was decreased slowly to allow foam formation. Foam formed. Full vacuum was reached. In conclusion, this experiment has shown that nucleation of gas bubbles can be achieved by vortexing vials containing concentrated solutions. After that the boiling and foaming process become self supportive.

Ultrasound

Ultrasound or ultrasonic waves are super high frequency waves undetectable by the human ear. Under appropriate conditions, irradiation of a liquid with ultrasound leads to the formation and collapse of bubbles in a solution.

According to the principles of ultrasound, described in various publications including Basil Brown and John E. Goodman, *High-Intensity Ultrasonics: Industrial Applications* (1965), *Ultrasonics: Fundamentals, Technology, Applications,* 2nd ed., rev. and expanded (1988), Kenneth S. Suslick (ed.), and *Ultrasound: Its Chemical, Physical, and Biological Effects* (1988) these high frequency waves are capable of producing bubble nucleation in a solution.

In the present invention, a solution containing sensitive biological material is irradiated with ultrasonic waves. The high frequency waves induce bubble nucleation in the solution. Within the product chamber of the present invention, bubble production leads to boiling followed by foam formation of the biological material. Especially preferred are ultrasonic waves in the frequency range of 20 kHz to 500 MHz.

Using sonication in the present invention can quickly disperse large temperature gradients, as measured in stationary mode experiments. Instead, the solution evaporates until it has reached a critical viscosity level (or density level) wherein boiling commences, quickly followed by foaming. The nature of the biological materials being preserved requires restricted heat input because of potential effects on the sensitive material. The use of ultrasound allows for lower temperatures to be used in the heat transfer fluid (or other heat source) and faster processing time because of superior convective heat transfer. Cavitation provides a means of increasing the rate of bubble formation in the foaming process, and it reduces the size of bubbles being produced during the boiling process. This helps prevent the violent boiling and splashing of material onto the process chamber walls. Product entrainment in the exiting vapor stream is also minimized by the presence of cavitation. Uniform bubbling caused by ultrasonic waves, minimizes much of the wall coating effect and the large temperature gradients in the bulk fluid which are seen in stationary drying.

A solution's tendency to cavitate is represented by the cavitation number, $\sigma_i$, as shown in the equation below.

$$\sigma_i = \frac{(P - P_v)}{\rho V^2/2}$$

Where P is the static pressure in stationary conditions, $P_v$ is the solution vapor pressure, ρ is the liquid density, V is the free-stream velocity of the liquid (which can be taken to be the tip speed of the stir bar). A low $\sigma_i$ implies increased tendency to cavitate. Of note is that as density goes up, cavitation is more easily produced and as system pressure falls cavitation is also more likely.

Biological Materials—Biologically active materials which can be preserved by the present methods include, without limitation, biological solutions and suspensions containing peptides, proteins, antibodies, enzymes, co-enzymes, vitamins, serums, vaccines, viruses, liposomes, cells and certain small multicellular specimens. Dehydration of biological specimens at elevated temperatures may be very damaging, particularly for example, when the temperatures employed for drying are higher than the applicable protein denaturation temperature. To protect the samples from the damage associated with elevated temperatures, the dehydration process may be performed in steps or by simultaneous increase in temperature and extent of dehydration. Primary dehydration should be performed at temperatures that are sufficiently low to permit dehydration without loss of biological activity.

Protectants (fillers)—A variety of polyols and polymers are known in the art and may serve as protectants as long as they enhance the ability of the biologically active material to withstand drying and storage and do not interfere with the particular biological activity. Indeed, the protectant molecules provide other advantages during preservation (see infra, as an aid to generating mechanically stable foams) besides stabilizing biological materials during dehydration. More particularly, the protectants in accordance with the present invention may include, without limitation, simple sugars, such as sucrose, glucose, maltose, sucrose, xylulose, ribose, mannose, fructose, raffinose, and trehalose, non-reducing derivatives of monosaccharides and other carbohydrate derivatives, sugar alcohols like sorbitol, synthetic polymers, such as polyethylene glycol, hydroxyethyl starch, polyvinyl pyrrolidone, polyacrylamide, and polyethyleneamine, and sugar copolymers, like Ficoll and Dextran, and combinations thereof Low molecular weight, highly soluble proteins may also serve as protectants.

In a variation of the present invention, where cells or viruses are being preserved, the protective composition may further comprise mixtures of a low molecular weight sugar, a disaccharide, oligosaccharide and polymer including biological polymer. The low molecular weight sugar is used to penetrate and protect intracellular structures during dehydration. The low molecular weight, permeating sugars may be selected from a variety of ketoses, which are non-reducing at neutral or higher pH, or methylated or ethylated monosaccharides. Among the non-reducing ketoses, are included: the six carbon sugars, fructose, sorbose, and piscose; the five carbon sugars, ribulose and xylulose; the four-carbon sugar, erythulose; and the three-carbon sugar, 1,3 dihydroxydimethylketone. Among the methylated monosaccharides, are the alpha and beta methylated forms of gluco, manno, and galacto pyranoside. Among the methylated five carbon compounds are the alpha and beta forms of arabino and xylo pyranosides. Disaccharides, like sucrose, are known to be effective protectants during desiccation because they replace the water of hydration on the surface of biological membranes and macromolecules. In addition, sucrose and/or other fillers may be effectively transformed into a stable foam composed of thin amorphous films of the concentrated sugar when dried under vacuum.

Primary Foam-Drying—To facilitate scale-up of the processing operations, preservation by foam formation involves the formation of a mechanically stable porous structure by boiling under a vacuum. The drying step is carried out at temperatures in the range of about −15° to 70° C. The mechanically stable porous structure, or foam, consists of thin amorphous films of the concentrated fillers. Preservation by foam formation is particularly well suited for efficient drying of large sample volumes, before vitrification, and as an aid in preparing a readily milled dried product suitable for commercial use. Further details of preservation by foam formation are included in U.S. Pat. No. 5,766,520 to Bronshtein; incorporated herein in its entirety by reference thereto.

In a variation of the present invention, dilute biological samples may be concentrated by partially removing the water to form a viscous specimen before foam-drying under vacuum. This initial concentration step can be accomplished either before or after introduction of the sample into the processing chamber, depending on the concentration method chosen. Alternatively, some samples may be sufficiently viscous after addition of the protectant molecules, and therefore not require any initial concentration. In situations where it is desirable to increase the viscosity of the samples, methods contemplated for use in initial concentration include freeze-drying, evaporation from liquid or partially frozen state, reverse osmosis, other membrane technologies, or any other concentration methods known in the art.

The samples are subjected to vacuum, to cause them to boil during drying at temperatures substantially lower than 100° C. In other words, reduced pressure is applied to solutions or suspensions of biologically active materials to cause the solutions or suspensions to foam during boiling, and during the foaming process further solvent removal causes the ultimate production of a mechanically-stable open-cell or closed-cell porous foam.

While low vacuum pressures (in the range of 0.1–0.9 atm) may be applied to facilitate the initial evaporation to produce a concentrated, viscous solution, much higher vacuum pressures (0–24 Torr) are used to cause boiling. The vacuum for the boiling step is preferably 0–10 Torr, and most preferably less than about 4 Torr. Boiling in this context means nucleation and growth of bubbles containing water vapor, not air or other gases. In fact, in some solutions, it may be advantageous to purge dissolved gases by application of low vacuum (about 0.1–0.9 atm) at room temperature. Such "degassing" may help to prevent the solution from erupting out of the drying vessel. In accordance with the present invention, degassing can be preformed by mixing, ultrasound, chamber rotation, crystals, or some other means. In an especially preferred embodiment, a flexible magnetic ring is used to "degas" the solution. Once the solution is sufficiently concentrated and viscous, high vacuum can be applied to cause controlled boiling or foaming. Concentration of the protectant molecules recited above, in the range of 5–70% by weight, during initial evaporation aids in preventing freezing under subsequent high vacuum and adds to the viscosity, thereby facilitating foaming while limiting uncontrolled eruptions.

Rapid increases in pressure or temperature could cause a foam to collapse. In this case, to enhance the mechanical stability of the porous structures, surfactants may be added as long as those additives do not interfere with the biological activity of the solute intended for conversion to dry form. Moreover, drying of the protectant polymers also contributes to the mechanical stability of the porous structures. Prepared foams may be stored in the processing chamber under vacuum, dry gas, like $N_2$ atmosphere and/or chemical desiccant, prior to subsequent processing operations, (e.g. stability drying, vitrification or milling).

The following working examples illustrate formation of the mechanically stable porous foam in accordance with the process of preservation by foam formation:

(1) An aqueous 50% glycerol isocitrate dehydrogenase solution from Sigma Chemical Co. containing 59.4 units of activity per ml was dialyzed for 5 hours in 0.1 M TRIS HCl buffer (pH 7.4). The activity of the isocitrate dehydrogenase in the 0.1 M TRIS HCl solution after dialysis was 26±1.8 units per ml. The activity decrease was associated with a decrease in the enzyme concentration because of dilution during the dialysis.

A mixture (100 $\mu$l) containing 50 $\mu$l of 50% by weight sucrose solution and 50 $\mu$l of the isocitrate dehydrogenase suspension in 0.1 M TRIS HCl buffer (pH 7.4) was placed in 1.5 ml plastic tubes and preserved by drying at room temperature. First, the samples were dried for 4 hours under low vacuum (0.2 atm). Second, the samples were boiled during 4 hours under high vacuum (<0.01 atm). During this step, a mechanically stable dry foam was formed in the tubes. Third, the samples were stored during 8 days over DRIERITE under vacuum at room temperature.

After 8 days, the samples were rehydrated with 500 $\mu$l water. Rehydration of the samples containing dry foams was an easy process that was completed within several seconds. The reconstituted sample was assayed for activity by assaying ability to reduce NADP, measured spectrophotometrically at 340 nm. The reaction mix included: 2 ml 0.1 M TRIS HCl buffer, pH 7.4; 10 $\mu$l of 0.5% by weight NADP+; 10 $\mu$l of 10 mM $MnSO_4$; 10 $\mu$l of 50 mM 1-isocitrate; and 10 $\mu$l of an isocitrate dehydrogenase solution. The activity was 2.6±0.2 units/ml, which means there was no loss of activity during drying and subsequent storage at room temperature.

(2) A mixture (100 $\mu$l) containing 50 $\mu$l of 50% by weight sucrose and 50 $\mu$l of an ice nucleating bacteria suspension, (INB) Pseudomonas Syringae ATCC 53543, were placed in 1.5 ml plastic tubes and preserved by drying at room temperature. First, the samples were dried for 4 hours under low vacuum (0.2 atm). Second, the samples were boiled during 4 hours under high vacuum (<0.01 atm). After boiling under high vacuum, a mechanically-stable porous structure was formed. Third, the samples were stored during 8 days over DRIERITE under vacuum at room temperature.

After 8 days, the samples were rehydrated with 500 $\mu$l water. Rehydration of the samples containing the dry foams was an easy process that was completed within several seconds. Then the samples were assayed for ice nucleation activity in comparison with control samples. There was no significant difference between the ice nucleating activity per 1,000 bacteria in the samples preserved by the present method versus the control samples.

(3) A sample containing a 1:1 mixture of a concentrated suspension of ice nucleating bacteria (INB) Pseudomonas Syringae ATCC 53543 and sucrose has been used. The sample was mixed until all sucrose crystals were dissolved, so that the final suspension contained 50 wt % sucrose. The suspension was placed in 20 ml vials at 2 g per vial. The vials were dried inside a vacuum chamber. The vials were sitting on the surface of a stainless steel shelf inside the chamber. The shelf temperature was controlled by circulating ethylene glycol/water antifreeze at a controlled temperature inside the shelf. Before the vacuum was applied the shelf temperature was decreased to 5° C. Then, the hydrostatic pressure inside the chamber was decreased to 0.3 Torr. Under these conditions the suspension boiled for 30 min. The temperature of the shelf was then slowly (during 30 min) increased up to 25° C. Visually stable dry foams inside the vials under these experimental conditions were formed within 3 hours. Subsequently, the samples were kept under the vacuum at room temperature for one more day. Ice nucleating activity of preserved INB was measured after the samples were rehydrated with 10 ml of 0.01 M phosphate buffer. Ice nucleating activity was measured as a concentration of ice nucleate centers that can nucleate an ice crystal in a 10 $\mu$l buffer drop during 5 minutes at −5° C. The results of the assay show ice nucleating activity in the preserved samples was equivalent to that observed in fresh controls.

(4) A concentrated INB suspension was frozen to −760 C. for future use. The frozen suspension (6 g) was thawed at 4° C. and mixed with 4 g of 9:1 sucrose: maltrin mixture. The sample was mixed until the sugars were completely dissolved, so that the final suspension contained 35 wt % sucrose and 4 wt % maltrin. The suspension was placed inside 20 ml vials at 2 g per vial. The vials were dried inside a vacuum chamber. The vials were sitting on the surface of stainless steel shelf inside the chamber. The shelf temperature was controlled by circulating ethylene glycol/water antifreeze at a controlled temperature inside the shelf. Before the vacuum was applied the shelf temperature was decreased to 5' C. The hydrostatic pressure inside the chamber was then decreased to 0.5 Torr. Under such conditions, the suspension boiled for 30 min. The temperature of the shelf was then slowly (during 30 min) increased up to 25° C. Visually, the formation of stable dry foams inside the vials under these conditions was completed within 2.5 hours. After removal of several vials, the temperature was increased to 50° C. and the remaining samples were kept under vacuum for 7 days.

Ice nucleating activity of preserved INB was measured after the samples were rehydrated with 10 ml of 0.01 M phosphate buffer. Ice nucleating activity was measured as a concentration of ice nucleating centers that nucleate an ice crystal in a 10 ul buffer drop during 5 min at −5° C.

The ice nucleating activity of the samples that had been removed from the vacuum chamber after drying at 25° C. was approximately 50% less than the initial activity of frozen-thawed INB. (The relative standard error in the measurement of ice nucleating activity is less than 20% ). Because, it is known that freezing of INB does not significantly decrease ice nucleating activity, the 50% decrease of the activity observed in this experiment is probably because the additional freezing step increases sensitivity of INB to preservation by drying. At the same time, no additional decrease of the activity of the INB was observed after an additional 7 days drying at 50° C. under vacuum.

(5) When stable foams containing INB, prepared as above, were subjected to milling using a modified Virtis homogenizer, there was no loss of ice nucleating activity in the rehydrated powder, compared to the rehydrated foam.

(6) A 60 wt % sucrose solution (1 ml) was dried in 20 ml glass vials inside a vacuum chamber. The vials were sitting on the surface of a stainless steel shelf inside the chamber. The shelf temperature was controlled by circulating ethylene glycol/water antifreeze at a controlled temperature inside the shelf. The temperature of the shelf in this experiment was kept at 20° C. The hydrostatic pressure inside the chamber was kept equal to 0.3 Torr. Under such conditions the solution slowly boiled, forming a foam consisting of thin films containing concentrated sucrose in the amorphous state. It took 2 to 3 hours to form visually stable dry foams inside the vials under these experimental conditions.

(7) Freeze-dried samples of Urokinase were rehydrated with 2 ml of 40 wt % sucrose. The solutions were then transferred to 20 ml sterilized glass vials for future preservation by drying. Before drying, the vials were covered with gray slotted rubber stoppers. The vials were dried inside a vacuum chamber. The vials were sitting on the surface of a stainless steel shelf inside the chamber. The shelf temperature was controlled by circulating ethylene glycol/water antifreeze at a controlled temperature inside the shelf. Before the vacuum was applied the shelf temperature was decreased to 5° C. Then the hydrostatic pressure inside the chamber was decreased to 0.5 Torr. Under such conditions, the suspension boiled for 30 min. The temperature of the shelf was then slowly increased up to 25° C. during 30 min. Visually, under these experimental conditions, stable dry foams were formed inside the vials within 3 hours. After an additional 12 hours of drying at room temperature, the temperature was increased to 45° C. and maintained for an additional 24 hours. After that the chamber was filled with dry $N_2$ gas, the rubber stoppers were pushed down and the vials were sealed with aluminum crimp seals.

The samples were assayed immediately after drying and after 30 days of storage at 40° C. After drying the Urokinase, activity was 93% of the initial activity. This decrease was associated with the loss of Urokinase during transfer from initial vials to the vials at which the Urokinase was dried. After 30 days of storage at 40° C. the activity was 90% . In other words, no additional significant decrease of Urokinase activity was observed during a month of storage at 40° C.

(8) Freeze-dried samples of Amphotericin B were rehydrated with 5 ml 40 wt % sucrose per vial. Then the solutions were transferred into 50 ml sterilized glass vials for future preservation by drying. Before drying, the vials were covered with gray butyl slotted rubber stoppers. The vials were dried inside a vacuum chamber. The vials were placed on the surface of a stainless steel shelf inside the chamber. The shelf temperature was controlled by circulating ethylene glycol/water antifreeze at a controlled temperature inside the shelf. Before the vacuum was applied the shelf temperature was decreased to 5° C. The hydrostatic pressure inside the chamber was decreased to 0.5 Torr. Under such conditions the suspension boiled for 30 min. The temperature of the shelf was then slowly (during 30 min) increased to 25° C. Visually, stable dry foams were formed inside the vials under these experimental conditions within 3 hours. After an additional 12 hours of drying at room temperature, the chamber was filled with the dry $N_2$ gas and the rubber stoppers in a portion of the vials were pushed down. The vials were removed from the chamber and subsequently sealed with aluminum crimped seal. The samples were assayed immediately after drying and after 30 days of storage at 27.5° and 40° C. The results are shown in Table 1, together with the results obtained in the next experiment.

Another set of freeze-dried samples of Amphotericin B was rehydrated with 5 ml 40 wt % sucrose per vial. The solutions were then transferred into sterilized glass vials for future preservation by drying similar to that described above with additional drying at 45° C. for additional 24 hours. After that, the chamber was filled again with the dry $N_2$ gas, the rubber stoppers were pushed down and the vials were sealed. The samples were assayed right after drying and after 30 day of storage at 27.5° and 40° C. The results are shown in Table 1.

TABLE 1

| | Potency of Amphotericin (%) | | |
|---|---|---|---|
| | After drying | After 30 days at 27.5° C. | After 30 days at 40° C. |
| Td = 25° C. | 108 | 114 | 95 |
| Td = 45° C. | 103 | 102 | 104 |
| Control | 126 | N/A | N/A |

Where Td is the maximum temperature during drying

The decrease of Amphotericin activity immediately after drying was associated with the loss of Amphotericin during transformation from initial vials to the vials at which the Amphotericin was dried. The results of the assay (Table 1) suggested that the loss of potency was only detected in those samples dried at the lower temperature (25° C. ) and subsequently stored at 40° C.

(9) A 1.5 ml tube containing a frozen (−76° C. ) suspension of *E. coli* (XL10-GOLD) from Stratagene was thawed in an ice bath. A 100 $\mu$l aliquot was transferred to 50 ml of NZYM (Casein digest yeast extract medium) broth and incubated at 37° C. on an orbital shaker overnight. After 14 hours of growth, 10 ml of this growth culture was inoculated into 100 ml of sterile NZYM broth to continue the culture growth at 37° C. During the culture growth the optical density (OD@620 nm) was measured every hour to determine the end of logarithmic bacteria growth. When the transition phase was reached (OD=1 to 1.06) the cells were ready to be harvested. The culture medium (5 ml) was pipetted into a centrifuge tube and centrifuged for 10 min. The supernatant was then poured off and the weight of the pellets was measured to determine the approximate concentration of the cells.

The cells were resuspended with 5 ml of NZYM broth or preservation solution consisting of 25% sucrose and 25% fructose in MRS broth. The cells resuspended with NZYM broth were used as a control. The cells suspended in 25% sucrose and 25% fructose in MRS broth (1 ml) were placed in 20 ml glass vials and dried under vacuum similar to the INB were dried in the Example #2. After that, the samples were kept under vacuum up to 24 days at room temperature. Dried samples were assayed at selected time intervals. The survival of the preserved cells was measured after rehydration with 0.1% peptone solution in water at room temperature. To determine concentration of viable cells the suspensions were pour plated in Petri dishes at the appropriate dilution on LB Miller agar followed by incubation at 37° C. for 36–48 hours. Approximately 25±10% of control cells survived after drying and one day of storage under vacuum. Moreover, the portion of surviving cells did not decrease during the subsequent 24 days of storage under vacuum at room temperature.

Optional Formation of a Uniform Powder—Regardless of the means selected for crushing the stable foam to a powder, the apparatus of the present invention may incorporate a crushing means within the same chamber, cylinder, or vessel in which the primary and optional stability drying step(s) are accomplished. Indeed, an advantage of such an embodiment is the integration of functions, previously carried out by separate pieces of equipment. Thus, a crushing means may be housed in the processing chamber and operated when at least one of the preservation step(s) has been completed.

However, in accordance with another preferred embodiment of the present invention, the apparatus for effecting the preservation of the sample may not include an integral milling means. Indeed, in many industrial applications, it may be preferred to foam dry and preserve the sample in bulk volumes within an isolated container, seal the container with the mechanically stable foam therein, and transport the container to a separate clean room or other barrier facility for industrial scale milling and/or other post-preservation processing.

Crushing means in accordance with the present invention includes conventional mills, homogenizers and sonicators, as well as other means for reducing the stable foam to a powder. These other means may include the physical deformation of a second container placed inside the drying chamber. The second chamber may be semirigid, wherein the foam is powdered by physical blows to the container or may be flexible, like a bag, wherein the foam is powdered by crushing or other physical deformation. In another preferred embodiment, the flexible magnetic mixing impeller can be removed from the bag, cleaned and reused. Alternatively, preservation may take place within grid cells in a partitioned tray, wherein the foam may be scraped from the grid and crushed. The various crushing means are described in greater detail below.

A. Conventional Milling—Conventional milling methods and components may be used in accordance with the present invention. These include without limitation: brush mills; rotating blade mills as described in U.S. Pat. No. 5,352,471; pulverizing mills as described in U.S. Pat. No. 4,651,934; rotary attrition mills described in U.S. Pat. No. 4,404,346; jet mills, for example, of the type of the spiral or counter-pipe mills (CF Winnacker, Kucher; *Chemische Technologie,* 4th Edition, Volume 1, p.91–93, 1984) as described and improved in U.S. Pat. No. 4,917,309; incremental cutting action mills, for example, a COMITROL® 1700 Mill, as described in U.S. Pat. No. 5,520,932; ball mills; hammer mills (e.g. MIKROPULVERIZER®); rotary tubular mills containing impact resistant metal balls, metal cylinder or bars or stones, for example, the micronizing mill described in U.S. Pat. No. 5,174,512; homogenizers; sonicators; and mills containing wires, like a weed-whacker; and any other milling means known in the art. The above-referenced patent disclosures are incorporated herein in their entirety by reference thereto. The differences and advantages of the various types of mills, grinders and crushing mechanisms are well known to those of ordinary skill in pharmaceutical manufacturing techniques.

B. Deformable Container—There are a number of alternative approaches that can be taken to implement the concept of industrial scale drying and reducing to a powder. A variation from conventional milling uses a second container placed inside the drying chamber. This second container would serve as the holder of the process fluid that is to be preserved via foam formation. The container would be placed in the chamber and filled with the sample solution or suspension. This filling could be accomplished via a separate filling tube. Subsequent to the completion of preservation by foam formation, this same container could be sealed and withdrawn from the drying chamber and serve as either a final container or an intermediate container for further processing. Sealing could be accomplished via a simple capping device for semirigid containers or via heat sealing for flexible containers. In addition, if the container is semirigid, the mechanically stable foam contained within may be broken up in a kind of coarse milling, via a series of impacts of the container wall to a hard inflexible surface, or vice versa. If the container is flexible, as with a gas-permeable Lyoguard® bag, the foam contained within it may be coarsely milled by crushing the bag, using a relatively weak force. This could be accomplished with a simple roller device. Once coarsely broken up, the resulting particles may be either considered to be in finished form or, depending upon end use requirements, processed further by transferring to a milling and/or formulation machine. Since at this point the material would be in particle form, this transfer would be effected easily by gravity or vacuum devices commonly used in powder handling systems. The final milling would be performed by commercially available milling equipment and conducted in such a way as to mill the material to a particular particle size distribution as dictated by material final specifications. A Quadro Comil®, for example, would be suitable for this purpose.

Since in accordance with this mode of preservation, the secondary container would be in a vacuum environment during preservation by foam formation, the transfer of heat to the sample solution inside could be slow and difficult to control. This limitation could be overcome by using the concept of inductive heating. An induction coil wound around the exterior of the chamber would provide the heating source by inducing molecular motion in ionic species in the preserving solution. Alternatively, a bag holding device, termed a cassette, which would slide into and out of the drying chamber to provide for easier loading and unloading of the product could also serve as the device which would support the induction coil. Alternatively, the cassette could serve as the housing for more traditional heat transfer systems such as electrical resistance heating and recirculatory fluid heating. In order to provide for more uniform processing of the preservation solution, the cassette holding the container could also be made to rotate.

The concept of a second container provides a number of advantages beyond those already identified above. In particular for aseptic processing, the filling tube, chamber and the container could be pre-sterilized by commonly accepted practice (e.g., irradiation, vaporous hydrogen peroxide (VHP), steam, etc., depending on the materials of construction of the respective items). This approach, coupled with the sealing devices described above, provides for a barrier-type of processing, thus effectively isolating the operator and product from each other during the course of preservation by foam formation. This is highly desirable for handling biological and toxic materials. The use of isolation or barrier technology is becoming the standard design approach for processing such materials in the pharmaceutical industry.

A number of feasibility experiments have been conducted which have demonstrated proof-of-concept. Working examples and the results obtained using a deformable container are presented below.

(1) In the first test, the equipment set-up consisted of a 4.5 inch internal diameter glass tube connected to a standard Virtis SL600 Unitop condenser section and heated via two laboratory style hot plates from Corning. The opposite end of the glass tube was closed. A 200 ml solution of sucrose 50% (w/w) in de-ionized water was introduced to a 2 L PET beverage bottle, commonly used for soft drinks. This would be considered to be a semi-rigid container. The bottle was placed in the tube and the sucrose solution was preserved by foam formation. After mechanically stable foam was formed, the bottle containing the foam was held overnight at 0.3 Torr and 25° C. The next morning the vacuum was broken with air. Total process time was 23 hours. Immediately following tube disassembly, the bottle was removed from the tube and purged with dry nitrogen for approximately one minute. The bottle was capped with the accompanying plastic screw top. The foam appeared to completely fill the bottle. Slight pressure applied by hand on the outside of the bottle showed the foam to be extremely brittle. Next the bottle was struck against the laboratory counter about 8–10 times with light-moderate force. All of the foam inside broke apart into discreet particles with the visual and flow characteristics of sand. A small amount of material remained adhering to the bottle interior. The glass transition temperature of the coarse particulate material was 18° C.

(2) In a second test, the glass tube used in the first test was replaced with a jacketed glass tube. The jacket was filled with water and connected to a recirculating heater bath. The bottle used previously was replaced with a 1-gallon capacity polyethylene plastic storage bag, commonly available in supermarkets. This would be considered to be a flexible container. The bag was taped in place to a plastic holder to keep the bag open. The bag was filled with 150 ml of 50% (w/w) sucrose in de-ionized water. Primary foam drying was essentially completed 90 minutes later and the heating source switched to hot plates. Conditions at that point were 31° C. and 0.15 Torr. The foam was then held overnight. In the morning the vacuum was broken with dry nitrogen, the bag removed, purged with nitrogen for approximately 1 minute and then placed inside a Zip-Loc® 1-gallon plastic storage bag. Total process time was 71 hours. Gently crushing the bag by hand immediately reduced the foam to particles much like those produced in the bottle previously. The glass transition temperature of the resulting particles was 18.33° C.

(3) In a third test, the previous style bag was replaced with a longer, larger bag obtained from the bags used to package Petri dishes as supplied by VWR (100×15 mm size dishes). A 300 ml volume of sucrose solution, again 50% (w/w) in de-ionized water, was filled in the larger bag. After approximately 3 hours of primary foam drying, the heat was turned off on the circulating bath and heat supplied via the two hot plates. The next morning the hot plates were turned off (T=30° C., P=0.8 Torr) and the circulating bath set to 50° C. After about 7 hours the system temperature and pressure were 55° C. and 0.2 Torr, respectively. Total process time was 23.5 hours. The system vacuum was broken with dry nitrogen, the bag removed, transferred to a 1-gallon Zip-Loc® bag and crushed gently. As before, all of the foam easily reduced to the particles like those seen previously. The glass transition temperature was 33.3° C.

(4) The bacterial strain *Lactobacillus acidophilus* was grown in a two liter capacity fermenter using a standard protocol specific to the species. The fermenter cell population was counted at 8.1 ∀ $0.73\times10^8$. The cells were harvested by centrifugation, resulting in 200 ml of cell concentrate with a population of 7.83 ∀ $0.75\times10^9$. The cell concentrate was diluted in preservation solution consisting of 800 ml of 40% sucrose, 10% methyl α-D glucopyranoside dissolved in 50% buffer (w/w). The resultant mixture was filled into a polyethylene Petri dish bag at 300 ml. The remainder was reserved for another use. The empty polyethylene bag was attached to a holding device located inside a 4.5×19 inch, cylindrical glass chamber supported by an aluminum frame. This glass chamber served as the bulk drying chamber for preservation by foam formation. The test solution was filled into the polyethylene bag with the aid of a length of silicone tubing. The glass chamber was also fitted with an external glass water jacket along the entire tube length. The jacket was coupled to a recirculating, temperature controlled water bath. The water jacket served as the heating source for the process. The glass chamber was connected at the discharge end to the condenser of a lyophilizer. At the conclusion of the preservation by foam formation process, the system vacuum was broken with dry nitrogen. The bag was removed and examined. Dry, mechanically stable, brittle foam had clearly been produced. The material was gently crushed into particles with the consistency of sand, using light hand pressure. The bag was cut open and the contents transferred to a clean container. The container was sampled in triplicate. The container was then purged with dry nitrogen and sealed. The samples were cultured and cell populations compared to control cultures of 1 ml of dried *Lactobacillus acidophilus* foam-dried in 10 ml vials by the same process. Results that clearly demonstrate survival of the test bacterial strain are summarized below:

| Sample Origin | Plate Count Mean | Plate Count Std. Dev. | Mass Assayed (g) | Volume Diluent (ml) | Activity Cell/g | Average per Sample | % Viable vs. Vial Control |
|---|---|---|---|---|---|---|---|
| Bag A | $1.21 \times 10^9$ | $0.91 \times 10^7$ | 0.2415 | 2.4 | $1.21 \times 10^9$ | $1.12 \times 10^9$ | 92.50 |
| Bag A | $1.09 \times 10^9$ | $1.05 \times 10^8$ | 0.3366 | 3.4 | $1.09 \times 10^9$ | | 83.10 |
| Bag A | $1.07 \times 10^9$ | $1.07 \times 10^8$ | 0.1848 | 1.8 | $1.07 \times 10^9$ | | 81.32 |

Gas-Permeable Bag—A product (now called Lyoguard®) developed by W. L. Gore for bulk lyophilization in an aseptic manner was also tested for its utility as an insert, deformable container in the process of preservation by foam formation. The Lyoguard® lyophilization bag was a heat sealable flexible bag consisting of one side that was a plastic that was not permeable to water vapor and another side consisting of a Gore-Tex® membrane. This membrane is an expanded polytetrafluoroethylene (PTFE), nominally 0.2 micron pore size, hydrophobic and not permeable to liquid water, but permeable to water vapor.

Because the Lyoguard® bag can pass water vapor while still preventing product in the liquid state from penetrating the membrane and leaking out, it provided an ideal way to process pharmaceutical products which in general require sterility. The basic method could also be applied to animal health products, probiotics, food, etc. In short, any product for which closed container processing might have an advantage in the areas of sterility, ease of handling, isolation of pathogens (e.g., bacteria and viruses) from the operators and extraneous particle contamination control could potentially benefit from application of the Lyoguard® bag to preservation by foam formation. In addition the flexible nature of the bag enhances the contact of the bag with the dryer shelf. Since the shelf is the heat transfer surface in a conventional freeze dryer, heat transfer should be optimal when conducting preservation by foam formation with the Lyoguard® bag. This could lead to faster drying cycles.

A series of experiments were initiated to investigate the possibilities of using the Lyoguard® Gore-Tex bag for preservation by foam formation. A 50% solution (w/w) with de-ionized water served as the testing media. A volume of 200 ml was filled into a 10×14 inch Lyoguard® bag. The bag was then heat-sealed using a commercially available heat-sealing device and placed on one shelf of a modified Virtis Genesis®) lyophilizer. The drying process was conducted. Boiling and eventually foam formation were observed through the semitransparent lower impermeable membrane of the bag as drying proceeded. After drying at 40° C. overnight, the bag was removed from the drying chamber and examined. Mechanically stable foam appeared to have formed. This dried foam was brittle and easily crushed into small particles in the bag without opening the bag. This indicated that the bag could also function as a container for coarse milling of the foam product. Within approximately 30 minutes the bag was opened and about 1 L of water was added to observe the reconstitution character of the dried particles. Most of the particulate material easily dissolved in less than 10 seconds. Subsequent test protocols involving volumes ranging from 200 to 400 ml in the 10×14 inch bag suggested that about 300 ml was preferred. At the completion of a typical run the appearance of the bag showed complete formation of foam and all of the material in the bag redissolved easily.

Bulk Drying in Trays—Bulk lyophilization of industrial enzymes, foods and pharmaceuticals is commonly done by utilizing stainless steel trays, which are placed on the temperature controlled shelves of the lyophilizer. The trays are typically filled in an appropriate environment for the particular product of interest and transported to the lyophilizer, whereupon the lyophilization cycle is run. Tray dimensions and capacity are largely determined by the shelf area of the lyophilizer, the allowable fill height for the product and the material handling characteristics desired. For preservation by foam formation, the basic operation would be the same. Product is prepared according to the previous examples, poured into standard lyophilization trays and preserved by foam formation in a machine configured to meet the required conditions. The tray could be constructed of any material that would allow the transfer of heat from the product shelf to the product contained within the tray. Examples of suitable materials are stainless steels, coated steels, non-ferrous alloys such as aluminum and titanium and plastics such as polypropylene, polyethylene and the like. It is recognized that plastics will transfer heat less efficiently, but may have other offsetting advantages.

Because of certain aspects of preservation by foam formation, a number of innovations described herein are necessary to the typical lyophilization tray in order for it to perform properly in the production of a mechanically stable, dry foam. In a preferred embodiment the tray would be fitted with a grid structure located in the internal space defined by the tray bottom and sides. This grid structure would essentially divide the area of the tray into a series of cells of equal or unequal area such that the entire tray would be sectioned into smaller units. The function of the grid would be to reduce the area available for expansion of the foam during preservation by foam formation, thereby containing foam bubbles inside the area of each grid. This effectively reduces the height to which a foam structure can grow, thus minimizing the chance that the growing foam will contact the dryer shelf or other dryer surface immediately above the foam and/or overflow out of the tray. The grid structure can take any geometric shape that will fit inside the tray. A square pattern such as that used to separate vials in shipping containers would be an example. Grid wall height should be at least half the height of the tray side to preclude the interconnection of foam bubbles with adjacent bubbles as foaming proceeds.

In another embodiment the tray would have a cover placed over the entire area defined by the tray bottom. This cover would be located in such a way as to permit the escape of water vapor during preservation by foam formation. The gap between the cover edge and top of the sides of the tray may be ¼ inch or less. Although gaps of larger dimensions would also work, it may be desirable to minimize total height of the shelf in order to maximize the volume available for production. The tray cover would be supported by any means available to effect such support and provide the clearance necessary between the top of the tray sides and the cover bottom edge. Auxiliary posts, integral cover tabs or spacers made of any of the above materials or any similar method would accomplish the required spacing. These tray drying methods could be applied to animal health products, probiotics, food, industrial enzymes, pharmaceuticals, vaccines, etc.

A series of experiments was conducted to investigate the feasibility of bulk drying in trays using a freeze dryer, modified for preservation by foam formation. In the first experiment, 400 ml of test solution, consisting of 50% sucrose (w/w) in deionized water, was filled into a stainless steel tray measuring 9½x19½x1¼ inches. The tray was placed on the middle shelf of a 3-shelf dryer. The material was then dried in accordance with the present invention. This test showed that although the tray could work as a bulk foaming container, there were problems both in containing the foam and in splashing of liquid onto adjoining surfaces during the boiling process. Close observation showed that the foam bubbles appeared to bridge across the whole area of the tray. Consequently, it was theorized that reducing this available area would prevent the foam bubbles from growing uncontrollably.

An insert consisting of a plastic-coated cardboard material in a 1 1/16x1 7/16 inch grid, which had been used to separate 20 ml vials in their shipping cartons, was cut to fit inside the stainless steel tray used in the previous test. A series of experiments were conducted using the grid insert. These tests showed that the foam could be produced much more controllably and the splattering outside of the tray reduced considerably when the grid was used. However, the test material showed a pronounced tendency to stick to the tray, making removal difficult after the cycle was completed. Coating the stainless steel surface with a non-stick coating such as polytetrafluoroethylene (PTFE) could provide a solution to that problem.

In order to test this idea, it was decided to explore the use of plastic trays. A 9½x19½x2½ inch tray was made of high-density polyethylene (HDPE). A removable HDPE insert having a 6x12 cell grid and a HDPE cover was also fabricated. In another series of experiments, the recovery from the tray clearly improved. The resulting foam also hydrated easily and quickly when reconstituted. Use of the cover led to control of splattering. In addition, cell-to-cell foam uniformity was also improved within the tray. Bulk drying in trays with grids may require the removal of the material from individual grid cells on the tray. One means of facilitating this would be to fabricate a device to manually, semiautomatically or automatically hold the tray and scrape the contents out of the tray interior. This could be accomplished by separately gripping the tray and tray insert, pulling them apart and then drawing a close clearance, blade-type scraper across the exposed tray interior. The insert could be scraped clean via the application of mechanical fingers sized for close clearance to the grid cell dimensions. These fingers would be forced through the grid cells, pushing the material out of the cells onto a surface that could be further scraped clean into a collection container.

Processing Chamber—The processing operations disclosed herein, comprising initial concentration, primary foam-drying, stability drying/vitrification, and subsequent milling are preferably conducted in a closed apparatus using barrier technology. In its simplest embodiment, the inventive apparatus may be a novel combination of a chamber having a heater and a cooler and a thermostat for regulating chamber temperature, a vacuum pump and a pressure-release valve for regulating chamber pressure, and a means for crushing a mechanically-stable porous foam. The apparatus may optionally be provided with a means for rotating the chamber during processing, such as a motor with a direct or belt drive mechanism, as is well known in the art.

The apparatus of the present invention includes means for regulating chamber temperature and pressure, as well as means for regulating milling. Means for regulating temperature may include a heater and a refrigerator/freezer and a thermostat, which together are capable of producing chamber temperatures in a range from about −70° to 100° C. during the various processing operations. Optionally, the heater may also be able to provide intra-chamber temperatures for sterilization in the range of about 100° to 300° C. Various means for application of heat and regulation of chamber and sample temperature are disclosed in detail below.

Means for regulating chamber pressure comprise a vacuum pump, optionally fitted with a condenser with a pressure-release or bleed valve that may be able to produce chamber vacuums in the range from about 0–500 Torr. More preferably, the vacuum pump may produce chamber pressures in the range of about 0–24 Torr (high vacuum) to about 0.1–0.9 atm (low vacuum). Novel means for regulating vacuum pressures in a bulk drying chamber are disclosed in co-pending U.S. Pat. Provisional Application No. 60/114,886 (and PCT Application No. PCT/US00/00157), which is incorporated herein in its entirety by reference thereto.

A mill controller may provide external means for controlling operation of the mill; the milling elements (e.g. brushes or blades) are located inside the chamber. In addition, preferred features of the apparatus may include a temperature sensor (e.g., thermocouple), pressure sensor, and possibly a detector for mill operation (e.g. tachometer).

Although the apparatus of the present invention need not necessarily incorporate a microprocessor or utilize computer-actuated control means, the use of a programmable computer to integrate the temperature, pressure and milling data, generate real-time control signals, and execute step-wise or simultaneous gradients of both temperature and pressure in accordance with programmed instructions allows automated implementation of a novel two-dimensional temperature and vacuum protocol for drying.

A variety of processing chamber materials and sizes are encompassed within the present disclosure. Indeed, the apparatus may be produced with smaller, analytical sized chambers, as well as larger, industrial scale chambers. Any materials may be employed in making the chamber as long as they are stable at the indicated temperature and pressure ranges, and compatible with the sensitive biological solutions and suspensions. For example, materials for construction of the processing chamber may include stainless steel, glass, and Plexiglas. Further, the chamber can be sterilized by conventional means. In one embodiment, the unit's heating means may be operated between sample runs at temperatures sufficient to sterilize the chamber and the enclosed milling means. Moreover, the integrated design may employ barrier technology, wherein no sample manipulation is required once it has been introduced into the closed system; thus, maintaining optimal product quality and sterility.

Another embodiment of the present invention includes the integrated functions of drying, milling and formulating a mixture of dry powders to form a "cereal" for various applications. For example, the bacterial strain *Lactobacillus acidophilus* is grown in a two liter capacity fermenter using a standard protocol specific to the species. The fermenter cell population is harvested by centrifugation and the cell concentrate is diluted in preservation solution consisting of 800 ml of 40% sucrose, 10% methyl α-D glucopyranoside dissolved in 50% buffer (w/w). The resultant mixture is foam-dried as described above in a deformable container. At the conclusion of the preservation process, the system vacuum is broken with dry nitrogen. The deformable container is sealed, removed from the drying chamber and the porous foam is gently crushed into particles with the consistency of sand, using light hand pressure.

A solution of 5% Vitamin C in the same preservation solution as the *Lactobacillus* above is foam-dried in a deformable container. The deformable container is scaled and the porous foam is crushed. Subsequently, the probiotic *Lactobacillus* powder can then be mixed with the Vitamin C powder using conventional powder handling equipment adapted for maintaining sterility to form a complex cereal having unique properties related to the probiotic and vitamin components. Such formulations may be prepared by mixing a variety of different biological and pharmacological powdered ingredients, such as mixing different vaccines or different antigens.

Powders representing a single component or formulations can then be used to prepare pharmaceutical compositions. For example, the materials can be pressed into tablets, which provide quick dissolvable solid dose preparations.

Sample Heating to Facilitate Drying—the bulk drying chamber described above allows for a number of important operational features. One feature is the use of a removable cassette that contains the conductive heat transfer surface. This same cassette can also be made to rotate. This permits mixing of the lot during foam formation, thus preventing potentially damaging concentration gradients and improving heat transfer by changing the condition mechanism from static to dynamic via the addition of a convective component from fluid mixing. Alternatively, a mixing bar placed in the bottom of the chamber will permit mixing of the material during foam formation. In addition, the use of a flexible secondary container is presented as a way to contain the lot during the process, to form a barrier between the product and the operator, which is effected by the use of heat sealing devices when the process is complete, and also to serve as an intermediate, or even final container for the preserved product, once the process is completed. Conductive heating is a Fourier's law process, which is limited by the heat transfer properties of the material, (e.g. thermal conductivity of the foam), the distance that heat must travel to affect water removal from the product, and the temperature differential. The use of inductive heating may overcome some of these limitations.

The inductive heating method is particularly effective for stability drying, which commences once a mechanically stable foam has formed. Stability drying seeks to remove sufficient water to raise the glass transition temperature to a desired value. An elevated glass transition temperature relative to the storage temperature permits long-term storage at room or elevated temperatures without product deterioration. This is desirable from a commercial standpoint. The very nature of foam is that it enables a small mass to be spread over a large area, creating thin films, which allows faster mass transfer of water from the product during drying. These thin films present a significantly shorter path length for water to travel to escape the product mass, thus reducing the time required for drying. However, the mass transfer advantage also poses a challenge in how to provide heat to the entire mass of foam in a uniform manner such that the water is driven off without excessive localized heating close to the source of conductive heat. In the foam state, conductive heat transfer is severely limited by the lack of sufficient conductive pathways. The foam forms the mass of product into a bubble-like structure, which consists of material of very small cross-sectional area for heat conduction, but large surface area for mass transfer. The foam is very similar in structural character to insulating foam, which is commonly used as a barrier to heat transfer. Thus, it is not surprising that heat transfer through the structure is slow. When performed inside the bulk drying apparatus, stability drying is typically done at higher vacuum levels than are employed during the foam formation process. These pressures are an order of magnitude lower than the foam formation pressures. Vacuums of 0 to 1 Torr (0–133 Pa), and preferably 0 to 0.5 Torr (0–66.5 Pa), and most preferably 0 to 0.1 Torr (0–13.3 Pa), are typically employed for stability drying. These pressures, in turn, also reduce the conductive heating of the load because insufficient air or water vapor is available at these pressures to add a significant gaseous component to the conductive heat transfer mechanism. It is possible to conduct the stability drying phase at near-atmospheric pressures, however that method requires that the remaining water be sufficiently low in concentration so as to not affect the foam structural stability as the pressure is raised. Thus the heat transfer problem, although lessened, is not completely eliminated by raising the drying chamber pressure.

Heat transfer is not as limited or sensitive to material, vacuum or distance in inductive heating as it is in conductive heating. A heating effect is induced in the product water by placing an inductive coil around the product and coupling the coil to a high frequency AC power source. This can be done by winding a coil around the exterior of the cassette, which contains the flexible container holding the product. A high frequency generator supplying alternating current, preferably at 5 MHz to 60 MHz, more preferably at 10–15 MHz, powers the inductive coil. The magnetic field induced in the interior of the cassette by this alternating current creates local induced currents (eddy currents or Foucault currents) in conductive solutions. Resistance to this current flow in the solution creates heat, which causes the water to evaporate from the product. A very useful feature of this mode of heating is that it is self-limiting, because as the water is removed, the eddy current effect is reduced to zero and heating stops. Thus, destructive melting of the material is prevented.

Conductive Heating

A cylindrical configuration for the removable bulk drying cassette utilizes the circumference of the cassette cylinder for the heating surface. This surface transfers heat directly to the process fluid contained in the flexible container or bag within the cassette. In another embodiment the cassette is eliminated and the vessel itself serves as both the holder for the flexible container and the heat transfer surface. This particular embodiment is most effective on smaller scale, when the process volume is less than 2 L and the vessel volume is less than 20 L. In either case, whether the removable cassette-style dryer, or only a single chamber dryer is used, as the volume of the vessel and/or cassette increases with increasing process volume, the efficiency of heat transfer declines with the diameter of the containment device. This is caused by the decreasing heat transfer surface to chamber volume ratio and the distance that heat must travel to the interior of the chamber. Surface varies linearly with the diameter and volume varies with the square of the diameter. End effects are minimal and not considered important in this process.

This surface to volume effect can be shown by the following illustrative example. In a 10 L chamber volume, lab scale bulk drying unit, a 1 L batch volume can be processed in the chamber, which consists of a 6.5 inch (165 mm) diameter by 15.6 inch (396 mm) long jacketed glass cylinder. A plastic bag is placed inside the cylinder as the flexible container for the process fluid that is to be preserved. The surface to volume ratio for a cylinder of these dimensions is 7.38, excluding the ends, which contribute little to the heat transfer during the foam forming process. This is because the process fluid is held at the bottom of the chamber by gravity. In contrast, in a 104 L pilot scale unit, a 10.3 L batch volume can be processed in the chamber, which consists of a 15 inch (381 mm) diameter and 36 inch (914 mm) length. By comparison, its surface to volume ratio is 3.2, again excluding the ends. In preservation by foam formation tests, the lab scale unit takes 24 hours or less to reach a glass transition temperature of greater than 30° C. On the other hand, the pilot scale unit requires 48 hours to achieve the same result. This is under essentially the same conditions of applied heat and vacuum, and identical starting 50% aqueous solution compositions of 4:1 sucrose:fructose in water. The primary reasons for this disparity in performance are the lower heat transfer surface to volume ratio and the greater distance that the heat must travel in order to reach the center of the cylinder and completely dry the product. In the early stage of evaporation and boiling the surface to volume ratio is the predominant factor. Later, after the formation of a mechanically stable foam, the path length that heat must travel becomes a predominant factor.

In one embodiment, the method and apparatus of the present invention significantly reduce the distance that the heat has to travel to drive the water from the product and improve the surface to volume ratio, thereby improving the heat flux (heat transferred per unit area) in the system. One goal is to reduce the processing time, which will have direct economic benefits in terms of increased throughput for the bulk dryer. This objective may be achieved by any configuration designed to reduce the distance that heat has to travel to dehydrate the product and improve the surface to volume ratio. For example, a smaller diameter central cylinder arranged longitudinally with its axis congruent with the primary cylinder may be employed to increase heat flux. Other configurations adapted to a similar purpose could be conceived of by those with skill in the art. However, any proposed internal heat transfer surface would preferably not impede the growth of foam during the formation of stable foam in the later stages of the process. Further, any proposed internal heat transfer surface would preferably not present an impediment to removal of the product from the bulk drying chamber.

In another embodiment a smaller diameter central cylinder arranged longitudinally with its axis congruent with the primary cylinder can be used. In order to use this alternative cylinder, a semi-rigid container or bag is introduced through a door to the cylindrically shaped drying chamber. The bag is constructed in such a way as to completely cover the external heat transfer surface of the inner cylinder and the internal heat transfer surface of the outer cylinder. The diameter selected for this central cylinder will have effects on the distance that heat must travel to reach the farthest point from the heat transfer surfaces, on the surface to volume ratio, and on the process volume. The ratio of cylinder length to diameter is preferably held to a range of about 2:1 to 4:1, more preferably 2:1 to 3:1, and still more preferably 2.4:1. Moreover, just about any length to diameter ratio can be used that does not impede the growth of foam. When the outer cylinder diameter is reduced, the ratio-derived cylinder length will then be reduced accordingly.

In a preferred embodiment, the inner cylinder diameter can be a ratio of the outer cylinder diameter. This can be from about 0.125 to 0.625 times the outer cylinder diameter and preferably, about 0.25 times the outer diameter. This central cylinder can be fabricated in such a way as to have a source of heat provided to the surface that would be exposed to the vessel interior. This source of heat could be an externally heated circulating fluid, such as water, commercially available heat transfer fluids, such as ethylene glycol, propylene glycol, Dowtherm A and the like, provided by a circulating pump system. The heat source could also be supplied via electrical resistance elements such as embedded resistance heaters in the wall of the cylinder. Other similar methods could be employed by those with skill in the art The vessel outer wall could also be made with a heat transfer surface, similarly supplied by the circulating heat transfer fluid system or resistance heating elements. The net result would be an inner and outer heat transfer surface. Significantly, this approach does not impede the growth of foam during the foam formation step of the process. Nor does it impede the removal of the final product from the bulk dryer. The effects of these alterations to standard outer-jacketed design for conductive heat transfer are to increase the overall heat transfer surface, reduce the distance that heat must traverse to reach the foam and to slightly reduce the available process volume.

The mode of operation would be as follows. Sample fluid to be preserved by foam formation is introduced to the bag within the chamber via a valve and feed tube. The valve is closed and preservation by foam formation is conducted. Water vapor is withdrawn by a vacuum pump and condensed on a condenser, as heat is supplied via the circulating heat transfer fluid or other means apparent to those with skill in the art. Temperature control of the process is monitored with a temperature sensing device such as a thermocouple, resistance temperature device, thermistor, infrared sensor and the like. The temperature signal is directed to a controller, which in turn controls the heat applied to the circulating fluid by resistance heating elements or other heating means. Vacuum control is effected by monitoring the chamber pressure with a vacuum gauge such as a capacitance manometer, pressure transducer and the like, as water vapor is evolved. This signal is sent to a second controller, which may be a programmable logic controller, ramp/soak controller and the like, preferably with dual-mode (pressure and temperature) control capacity. At the end of the preservation process, the vacuum is broken with dry air or nitrogen and the bag is heat-sealed using a heat sealing device at the entrance/exit port. The product bag is then withdrawn from the unit for further processing.

At an industrial scale, a 104 L vessel with a 10.3 L batch volume has dimensions of 15 inch (381 mm) diameter by 36 inch (914 mm) long. This vessel has a 7.5 inch (191 mm) heat transfer penetration depth coupled with a 3.2 surface to volume ratio. As discussed above, heat transfer in the large vessel compares unfavorably with the 10 L vessel. The smaller vessel heat transfer penetration depth is only 3.25 inches (82.5 mm) with a surface to volume ratio of 7.38. However, by introducing an 8.4375 inch (214.3 mm) diameter, centrally disposed cylinder, into the 104 L vessel, a number of beneficial changes may be realized. The heat transfer penetration depth would be reduced by 57% to 3.28 inches, the surface to volume ratio would be increased by 128% to 7.31 and the processing volume would be decreased by 31% to 7.1 L. In other words, by decreasing the volume that could be processed in a single run by about 31% in the 104 L vessel, we could produce nearly identical heat transfer performance as compared to the smaller 10 L vessel.

In larger vessels, typically of 5 L process volume and up, the method of handling the bag can be favorably altered such that a removable cassette is utilized. The operation of the unit would be similar to the apparatus described above with reference to inner cylinder embodiment. The primary difference is in the way the flexible container is handled. In accordance with the invention, a flexible container or bag is mounted onto a removable cassette. The cassette could be fabricated in such a way as to have the same type of inner cylindrical and outer cylindrical heat transfer surfaces as that described above.

The mode of operation would also be similar to that described above for the inner cylinder embodiment. The cassette is loaded into the cylindrical vessel chamber via a door. The cassette is attached to a combination seal/coupling device that both seals the rotatable drive shaft from the atmosphere during the process and provides a pathway for the heat transfer fluid or electrical service to be introduced to the cassette during the process. The seal could be a mechanical seal, o-ring seal, lip seal or other suitable vacuum sealing device. After the door is closed, sample fluid to be preserved is introduced to the bag via a valve and feed tube. The valve is closed and preservation by foam formation is conducted. Water vapor is withdrawn by a vacuum pump and condensed on a condenser, as heat is supplied via the circulating heat transfer fluid system or other means apparent to those with skill in the art. During the process the cassette is rotated by means of a motor coupled to the drive shaft. This rotation provides a convective element to the conductive heat transfer, and mixes the material to be preserved, thereby preventing concentration gradients. Temperature control of the process is monitored with a temperature sensing device such as a thermocouple, resistance temperature device, thermistor, infrared sensor and the like. The temperature signal is directed to a first controller, which in turn controls the heat applied to the circulating fluid or heating elements. Vacuum control is achieved by monitoring the chamber pressure with a vacuum gauge such as a capacitance manometer, pressure transducer and the like, as water vapor is evolved. This signal is sent to a second controller, which in turn directs its output to the vacuum pump control valve. The controllers may be combined into a single controller, which may be a programmable logic controller, ramp/soak controller and the like, preferably with dual-mode control capability. At the end of the preservation by foam formation process the vacuum is broken with dry air or nitrogen and the bag is heat-sealed using a heat sealing device at the entrance/exit port. The cassette is then withdrawn from the unit and the bag in turn is removed from the cassette for further processing. If equipped with a reclosable port, the bag can be placed in a dry environment and the port opened for further stability drying. This allows for faster turnaround of the machine for subsequent production runs.

It is important to note that the very nature of preservation by foam formation makes this innovative approach useful. Because of the state change of the product from liquid to solid during the course of the process, mixing to generate convective heat transfer in addition to pure conduction is not available as a way of improving heat transfer during secondary (stability) drying. Since stability drying is the most time consuming portion (>80% ) of the process, it is necessary to have some way to improve the heat transfer in the system to reduce that time. In addition, the sensitive nature of most of the products that would be candidates for preservation preclude the use of radiation because of the high temperatures typically required generated.

Inductive and Dielectric Heating

Regardless of the advantages of augmenting the conductive heat transfer surface in the above manner, the improvement in heat transfer surface afforded by the centrally located cylinder method is limited. Thus, non-traditional modes of introducing heat, for example via electromagnetic and electrostatic energy, become useful.

For aqueous solutions, magnetic induction heating is reasonably uniform in intensity across large distances, especially when compared to distance dependent conductive heating. This is because the usual skin depth effect seen when inductively heating metals does not apply as a limitation with aqueous solutions. For example, skin depth is calculated via the equation shown below (Zinn, S. et al):

| | | | |
|---|---|---|---|
| $d = 5000\ (\rho/\mu f)^{0.5}$, | where: | d | is skin depth in cm, |
| | | ρ | is resistivity in microohm-cm, |
| | | μ | is relative magnetic permeability, assumed to be 1 for water, and |
| | | f | is frequency in Hz. |

For normal saline (0.9% NaCl in water), the resistivity is $69.4\times10^{6}$ micro-ohm-cm, (CRC Handbook of Chemistry and Physics) and at 10 MHz the skin depth is 41.7 meters. Even for 0.1% saline this skin depth value at 10 MHz only reduces to 6.5 meters. This contrasts with plain carbon steel (AISI-SAE 1020), which has a resistivity value of 10 microohm-cm, and at 10 MHz has a skin depth of 1.58 cm. As a consequence, for magnetically driven high frequency induction heating of aqueous solutions, there is little practical limitation on the dimensions of the vessel containing the solution to be heated. The only requirement is the presence of an ionic species to lower the resistivity of pure water, such that a current may be more easily induced by the magnetic field. For biological solutions undergoing preservation this requirement could be met by the presence of pH buffering salts.

Containment of the magnetic field within the drying vessel, the need for non-metallic materials in the interior of the field for process fluid containment and the cooling requirements of the induction coil present some design and fabrication problems. As a consequence, an alternative form of electromagnetic energy is proposed. By designing the induction/capacitance (LC) load circuit powered by the high frequency source to be biased toward capacitance, the load coil used for induction heating can be replaced by a pair of electrodes which function as a capacitor. In its simplest embodiment this capacitor can be configured as a pair of flat plates disposed in parallel to each other. As with the induction heating application, the LC load circuit can be powered by a high frequency AC circuit in the range of about 5–60 MHz, more preferably about 10–15 MHz. This causes the capacitor to change polarity at a matching frequency, but out of phase with the power circuit. At the same time, any polar material located in between the capacitor plates, such as water, will realign its polar axis in response to the polarity of the field. As the field changes polarity, the molecule will rotate 180 degrees to realign itself with the new field polarity. Friction from this high frequency movement causes heating in the bulk of the material and is known as dielectric heating.

For bulk preservation by foam formation, dielectric heating offers some advantages over induction heating. First, since no electric currents are being generated in the material undergoing preservation by foam formation, the material does not have to have facilitating ionic species present, such as salts or buffers. Since sugars such as sucrose and the like are acceptable fillers for preservation by foam formation and most, if not all, are not ionic in nature, this is a benefit when the addition of ionic species is not desirable or they are present in extremely low concentrations. This would be applicable to some pharmaceutical preparations, which are formulated with low concentrations of ionic species. Second, the vessel wall that contains the product to be preserved can function as one of the electrodes and the second electrode can be the centrally located cylinder described in the conduction section of this patent application. Thus, no special induction coils are needed and vessel construction is simplified. For the application involving a removable cassette, the cassette outer wall can function as one electrode and the centrally located inner cylinder can function as the other electrode. The dielectric heating load circuit then becomes self-contained within the cassette. Since the cassette is removable, this makes for easier access to perform maintenance. Third, the capacitance electrodes do not generate internal self-associated heat as with induction coils. Since no auxiliary electrode cooling system is required, the design and operation of the system is simpler. Fourth, the presence of water as the dominant species in this application of dielectric heating allows for a potentially faster cycle, since water heats more easily in an electric field as opposed to a magnetic field. Fifth, as with inductive heating, removal of water during the drying process is self-limiting. Once the water is removed heating essentially ceases, thus, preventing overheating of the product, which would lead to melting.

One aspect that applies to both induction heating and dielectric heating is that the penetration depth of the heating effect is very large, on the order of tens of meters, uniform and insensitive to the vacuum level during the process. This makes either method particularly useful in the boiling phase of the preservation by foam formation process. Heat transfer is not surface area or distance limited as with conduction. It is only a function of power supplied, frequency and capacitor or inductor design. Another option is to use a combination of conduction heating and electric heating to maximize the heat transfer to the product water. This can be done by operating the electrodes in a low frequency mode (50 Hz–500 Hz) during the liquid or boiling phase of the process and switching to RF mode (5 MHz–60 MHz), once a mechanically stable foam has formed.

In accordance with one aspect of the invention, a drying apparatus having an inductive (dielectric) heating mechanism is disclosed. The cassette is loaded into the cylindrical vessel chamber via a door. The cassette is attached to a combination seal/coupling device that both seals the rotatable drive shaft from the atmosphere during the process and provides a pathway for the high frequency electric power generated by an radiofrequency (RF) power source. The seal could be a mechanical seal, o-ring seal, lip seal or other suitable vacuum sealing device. The power could be transmitted by a slip-ring or other similar device apparent to those with skill in the art.

After the door is closed, sample fluid to be preserved is introduced to the bag via a valve and feed tube. The valve is closed and preservation by foam formation is conducted. Water vapor is withdrawn by a vacuum pump and condensed on a condenser, as heat is supplied to the material to be preserved by the high frequency alternating field generated by the oppositely charged walls of the inner and outer cylinders of the cassette. The inner and outer cylinder are electrically isolated from each other by means of insulation such as polytetrafluoroethylene, polyethylene and other insulators known to those with skill in the art. As the polarity of the capacitor electrodes changes at high frequency (5 MHz–60 MHz), polar water molecules rapidly alter their orientation to the field causing heat from the friction of this high-speed rotational motion. Because of the depth of penetration of the field, the heating is uniform. During the process the cassette is rotated by means of a motor coupled to the drive shaft. This rotation mixes the material to be preserved, thereby preventing concentration gradients. Temperature control of the process is monitored with a temperature sensing device such as a thermocouple, resistance temperature device, thermistor, infrared sensor and the like. The temperature signal is directed to a controller, which in turn controls the heat applied to the process by the RF generator. Vacuum control is achieved by monitoring the chamber pressure with a vacuum gauge such as a capacitance manometer, pressure transducer and the like as water vapor is evolved. This signal is sent to a controller, which in turn directs its output to the vacuum pump control valve. The controllers may be combined into a single controller, which may be a programmable logic controller, ramp/soak controller and the like, preferably with dual mode control capability. At the end of the preservation by foam formation process the vacuum is broken with dry air or nitrogen and the bag is heat-sealed using a heat sealing device at the entrance/exit port. The cassette is then withdrawn from the unit and the bag in turn is removed from the cassette for further processing. If equipped with a reclosable port, the bag can be placed in a dry environment and the port opened for further stability drying. This allows for faster turnaround of the machine for subsequent production runs.

A similar design, but without the removable cassette would provide the same type of processing on a smaller scale. Therein, the vessel exterior wall would serve as one electrode and an internal, axially mounted, concentric cylinder would serve as the other electrode for the capacitor. This design would be simpler in that it would not require a rotational drive motor or shaft seal. Operation would be very similar to the non-cassette style conduction heater described in the conduction section, except that heating would be dielectric in nature.

Although the invention has been described in detail for the purposes of illustration, it is understood that such detail is solely for that purpose, and variations can be made therein by those skilled in the art without departing from the spirit and scope of the invention which is defined by the following claims. All references referred to above are hereby incorporated by reference.

What is claimed is:

1. An industrial scale process of preserving a biologically active material, comprising:

loading a solution or suspension containing the biologically active material into a process vessel adapted to fit within a process chamber;

subjecting the solution or suspension to drying conditions, which comprise a temperature and a vacuum pressure, wherein drying conditions are sufficient to cause the solution or suspension to boil without freezing;

subjecting the solution to bubble nucleation by mixing;

monitoring the drying conditions using a temperature sensor and a pressure sensor; and adjusting the drying conditions as required to maintain boiling without freezing by applying heat to the solution or suspension until a mechanically stable foam is formed.

2. The process of claim 1, wherein said mixing is caused by a stir bar.

3. The process of claim 2, wherein said stir bar is a flexible magnetic mixer ring, coated with Teflon, comprising short blades that can be folded.

4. An industrial scale process of preserving a biologically active material, comprising:

loading a solution or suspension containing the biologically active material into a process vessel adapted to fit within a process chamber;

subjecting the solution or suspension to drying conditions, which comprise a temperature and a vacuum pressure, wherein drying conditions are sufficient to cause the solution or suspension to boil without freezing;

subjecting the solution to bubble nucleation by chamber rotation;

monitoring the drying conditions using a temperature sensor and a pressure sensor; and adjusting the drying conditions as required to maintain boiling without freezing by applying heat to the solution or suspension until a mechanically stable foam is formed.

5. The process of claim 4, wherein said chamber rotation imparts shear forces to the solution.

6. An industrial scale process of preserving a biologically active material, comprising:

loading a solution or suspension containing the biologically active material into a process vessel adapted to fit within a process chamber;

subjecting the solution or suspension to drying conditions, which comprise a temperature and a vacuum pressure, wherein drying conditions are sufficient to cause the solution or suspension to boil without freezing;

subjecting the solution to bubble nucleation by ultrasonic waves;

monitoring the drying conditions using a temperature sensor and a pressure sensor; and adjusting the drying conditions as required to maintain boiling without freezing by applying heat to the solution or suspension until a mechanically stable foam is formed.

7. The process of claim 6, wherein said ultrasonic waves have a frequency in the range of 20 k HZ to 500 MHz.

8. The process according to any one of claims 1, 4, 6 wherein said temperature sensor is located above said solution or suspension level.

9. The process according to any one of claims 1, 4, 6 wherein said temperature sensor is located just at said solution or suspension level.

10. The process according to any one of claims 1, 4, 6 wherein said temperature sensor is located below said solution or suspension level.

11. A method of preserving a biologically active solution or suspension by boiling under vacuum while mixing said solution or suspension to induce forced convection, wherein mixing is accomplished by a stir bar.

12. A method of preserving a biologically active solution or suspension by boiling under vacuum while mixing said solution or suspension to induce forced convection, wherein mixing is accomplished by chamber rotation.

13. A method of preserving a biologically active solution or suspension by boiling under vacuum while mixing said solution or suspension to induce forced convection, wherein mixing is accomplished by ultrasonic waves.

14. An industrial scale process of preserving a biologically active material, comprising:

loading a solution or suspension containing the biologically active material into a process vessel adapted to fit within a process chamber;

subjecting the solution or suspension to drying conditions, which comprise a temperature and a vacuum pressure, wherein the drying conditions are sufficient to cause the solution or suspension to boil without freezing;

positioning a stir bar at the bottom of said process vessel;

activating said stir bar to mix said solution or suspension, wherein said mixing induces bubble nucleation;

monitoring the drying conditions using a temperature sensor and a pressure sensor; and adjusting the drying conditions as required to maintain boiling without freezing by applying heat to the solution or suspension until a mechanically stable foam is formed.

15. The process of claim 14, wherein said stir bar is a flexible magnetic mixer ring, coated with Teflon, comprising short blades that can be folded.

* * * * *